United States Patent [19]
Yoshinaga et al.

[11] Patent Number: 5,566,006
[45] Date of Patent: Oct. 15, 1996

[54] IMAGE READING APPARATUS FOR SELECTIVELY ILLUMINATING A FIRST OBJECT AND A SECOND OBJECT BY THE SAME LIGHT BEAM AND SELECTIVELY DETECTING IMAGED IMAGE INFORMATION THEREFROM

[75] Inventors: Kenji Yoshinaga, Tokyo; Akimitu Hoshi, Kawasaki; Motomu Fukasawa; Koji Kimura, both of Tokyo; Seiji Ohta, Yokohama, all of Japan

[73] Assignee: Canon Kabushiki Kaisha, Tokyo, Japan

[21] Appl. No.: 271,056

[22] Filed: Jul. 6, 1994

[30]     Foreign Application Priority Data

Jul. 8, 1993   [JP]   Japan ................................. 5-193138

[51] Int. Cl.$^6$ ................................................. H04N 1/04
[52] U.S. Cl. .......................... 358/475; 358/474; 355/228
[58] Field of Search .................................. 358/471, 472, 358/474, 494, 497; 355/67, 70, 228–229, 232–235, 244, 37–38, 43, 45; 348/96; 250/578.1, 575; 359/204, 205, 362–363, 388–389; H04N 1/04

[56]     References Cited

U.S. PATENT DOCUMENTS

| | | | |
|---|---|---|---|
| 4,908,719 | 3/1990 | Nonoyama | 358/494 |
| 5,021,833 | 6/1991 | Kobayashi et al. | 355/232 |
| 5,113,268 | 5/1992 | Yoshida et al. | 358/494 |
| 5,260,831 | 11/1993 | Suzuki et al. | |
| 5,452,050 | 9/1995 | Ishikawa et al. | 355/27 |
| 5,455,412 | 10/1995 | Imagawa et al. | 358/474 |

*Primary Examiner*—Kim Yen Vu
*Attorney, Agent, or Firm*—Fitzpatrick, Cella, Harper & Scinto

[57]     ABSTRACT

In an image reading apparatus, a first object and a second object are adapted to be illuminated on different regions each other with a light beam from a light source by an illuminating device. A first imaging optical system is provided to image image information of the first object on a single photoelectric converting device. A second imaging optical system is provided in an optical path different from that of the first imaging optical system so as to image image information of the second object onto the photoelectric converting device. The first and second object to be illuminated, and the photoelectric converting device are relatively displaced to read the image information of the first and second objects.

15 Claims, 13 Drawing Sheets

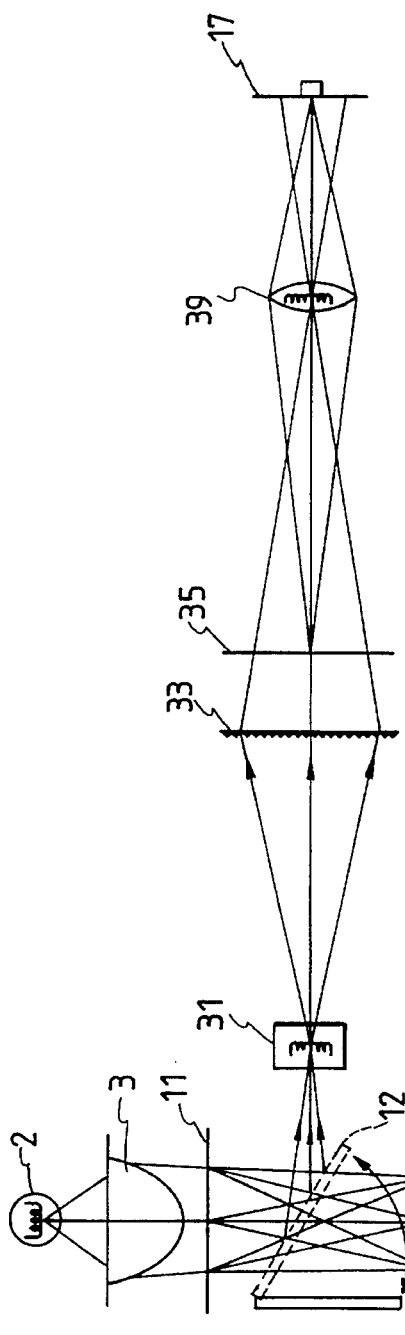
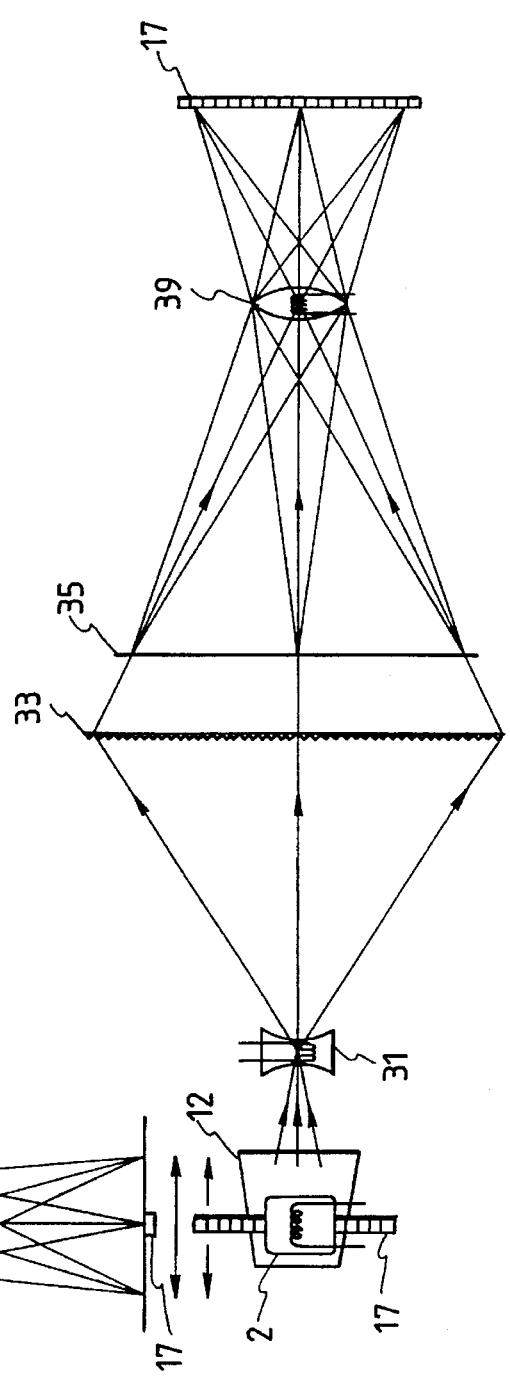
FIG. 4A
FIG. 4B

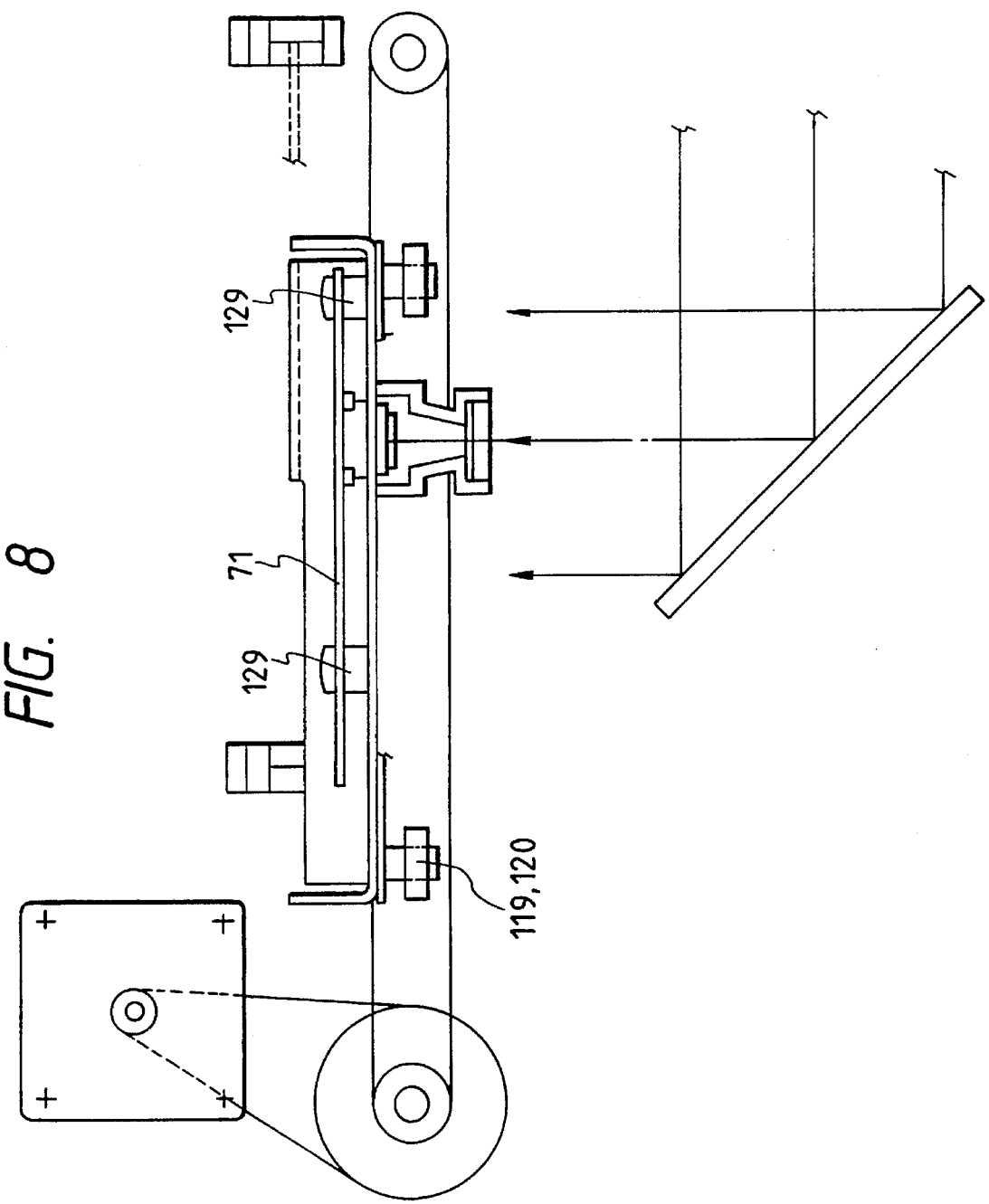

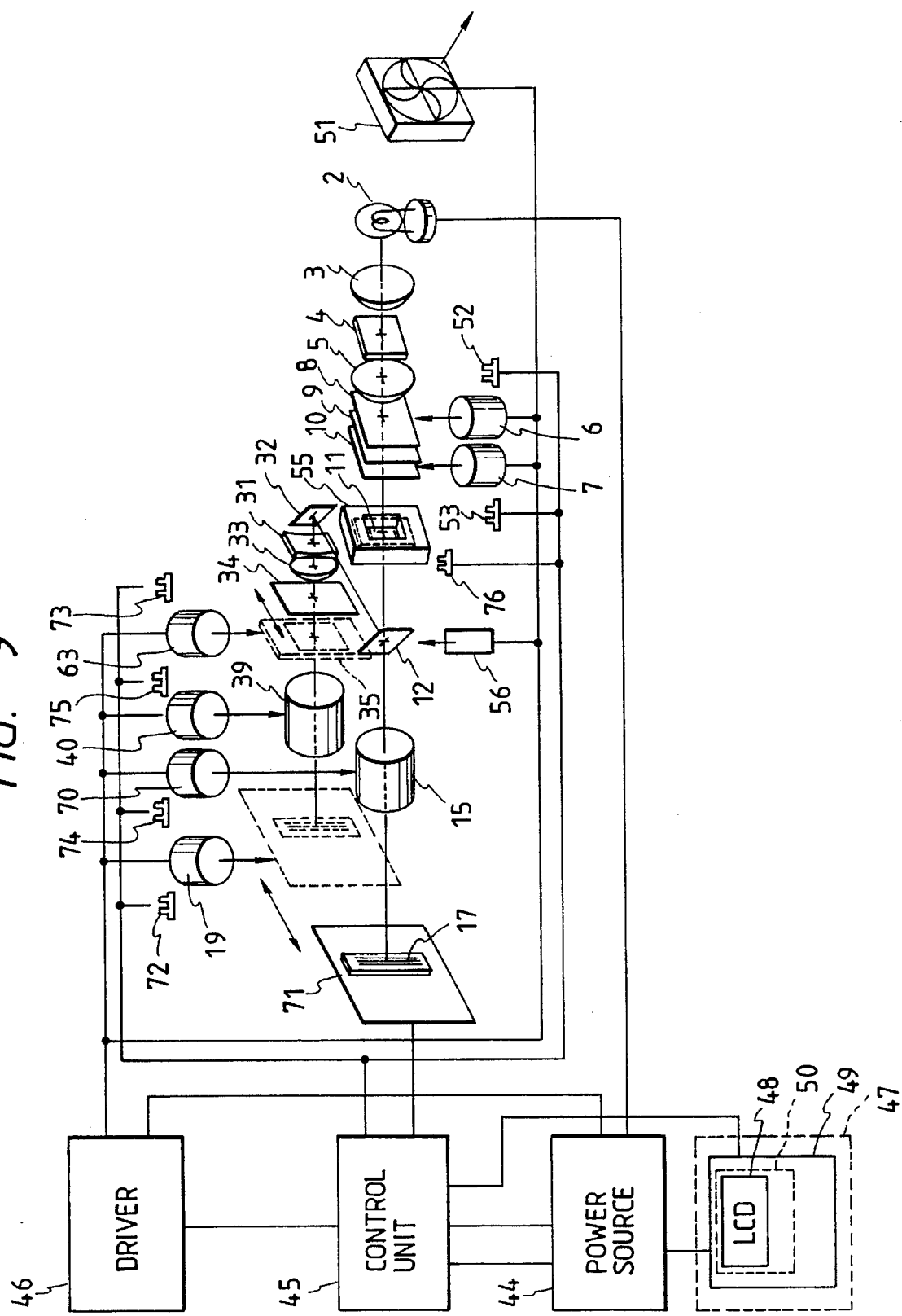

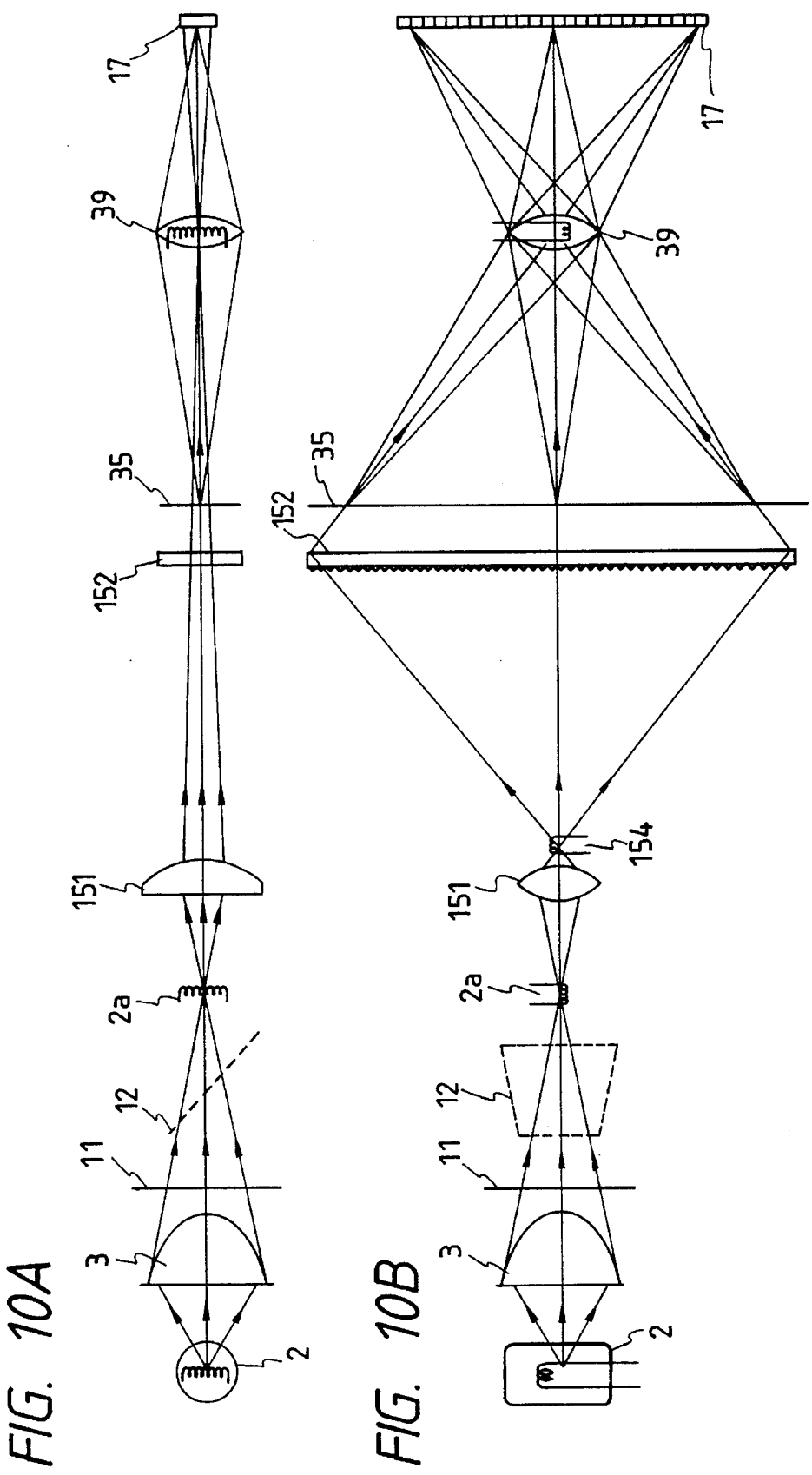

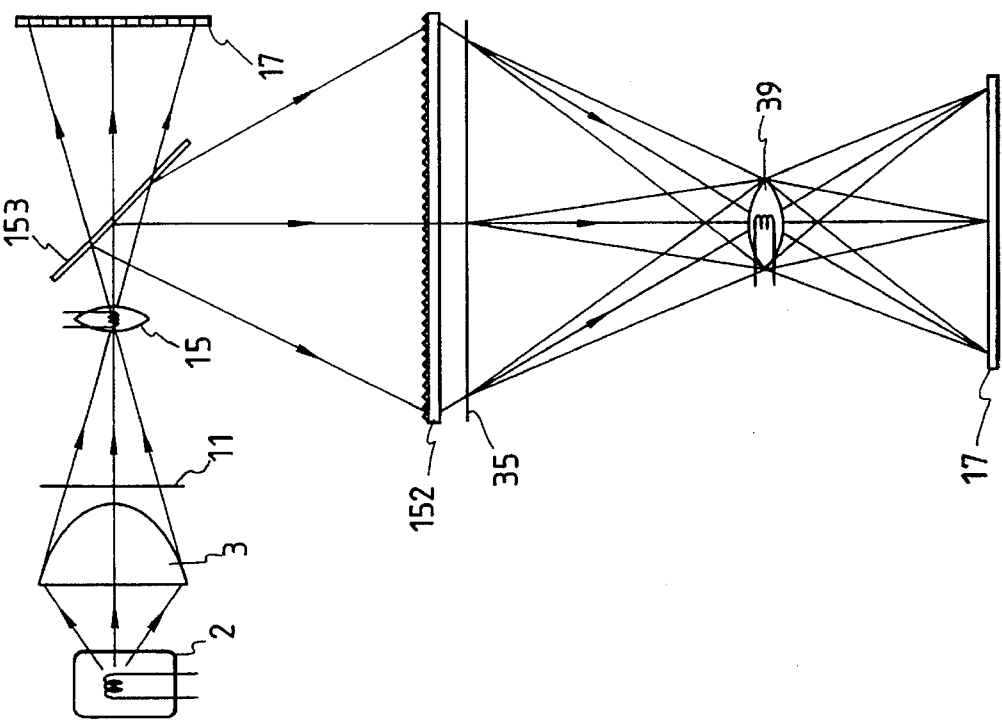
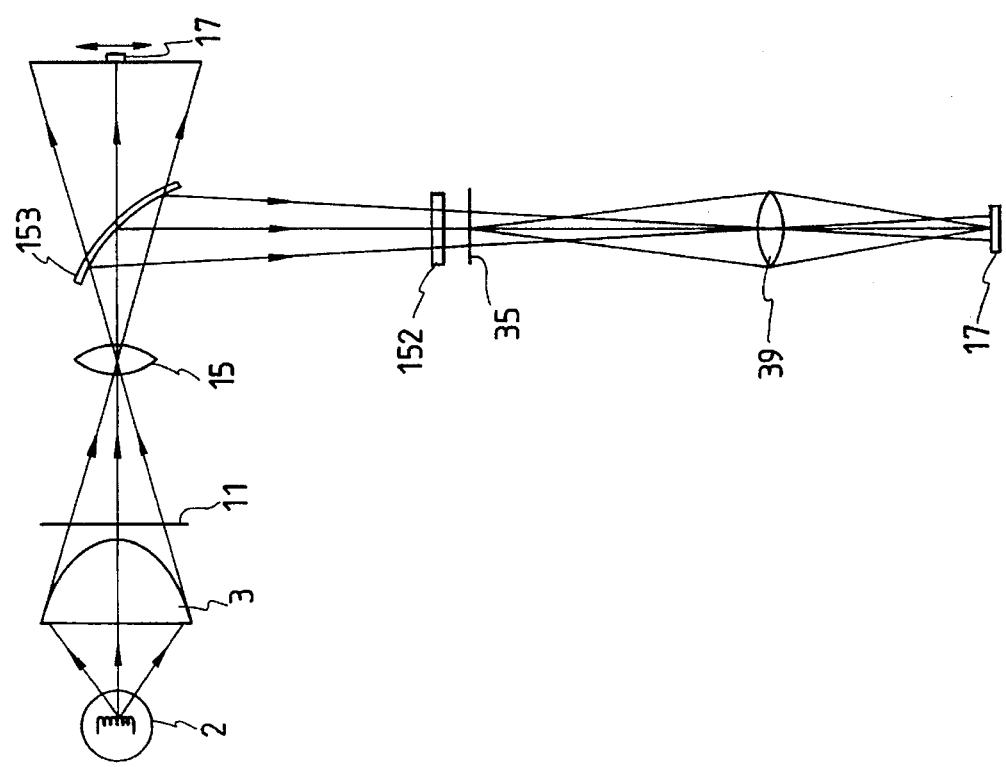

IMAGE READING APPARATUS FOR SELECTIVELY ILLUMINATING A FIRST OBJECT AND A SECOND OBJECT BY THE SAME LIGHT BEAM AND SELECTIVELY DETECTING IMAGED IMAGE INFORMATION THEREFROM

BACKGROUND OF THE INVENTION

1. Field of the Invention

The present invention relates to an image reading apparatus and, more particularly, to an image reading apparatus suitable for an apparatus such as an image scanner, a copying machine, or a facsimile, in which, even if originals are those having a wide variety of original sizes, e.g., films (objects), the space for an illuminating means can be small enough to allow extremely efficient illumination, and the image information of these originals also can be read with a high accuracy.

2. Related Background Art

In a conventional image reading apparatus such as an image scanner, a copying machine, or a facsimile, an image of a light beam reflected by a reflection original or an image of a light beam transmitted through a transmission original film, for example, is formed by an imaging means on the surface of a photoelectric converting means, such as a line sensor (CCD), in which a plurality of pixels (light-receiving elements) are arranged one-dimensionally, thereby reading the image information of that original.

In the above apparatus, detection data from the light-receiving elements corresponding to pixels are sequentially, electrically scanned (converted) in the longitudinal direction (main scan direction) of the line sensor. Meanwhile, in the lateral direction (subscan direction) of the line sensor, an original image (original film) and the line sensor are mechanically moved to scan relative to each other. Consequently, the image information of that original is two-dimensionally read.

If a wide variety of original sizes are to be handled, a plurality of imaging lenses of each different imaging magnification are provided to obtain matching between these original sizes and the detection line length of a line sensor. That is, the imaging lenses are switched in accordance with the size of a given original to permit a photoelectric converting means, such as a line sensor (CCD), to read the image information of that original.

Alternatively, a plurality of original illuminating means (light sources) having different illumination regions corresponding to original sizes may be provided. In this case, an illumination region of a given original is illuminated with a desired illumination quantity by switching the original illuminating means in accordance with the size of that original, and a photoelectric converting means, such as a line sensor (CCD), reads the image information of the original.

FIG. 1 is a schematic view showing main parts of a conventional image reading apparatus using a transmission original as an object to be projected.

Referring to FIG. 1, an original table (original support table) 501 is arranged horizontally at a fixed position of the apparatus main body. This original table 501 has a light-transmitting plate structure, and various original films F with different sizes can be placed on it. For example, the original films F from a 35-mm film (36 mm×24 mm) F1 to a 4×5-inch film (4 inches×5 inches) F2 can be placed.

An illuminating means 502 is arranged above the original table 501 in FIG. 1. The illuminating means 502 is so designed as to be able to evenly illuminate an entire region to be read of the original film F of the maximum size, e.g., the 4×5-inch film F2. In this case, it is necessary to be able to illuminate at least a circular region whose diameter is the length of the diagonal of the 4×5-inch film F2. Therefore, an illuminating system is constituted by using a large light source 503 and by increasing an illuminating optical path length L0.

An imaging means 510 has several different exchangeable imaging lenses of each different imaging magnification. Of these imaging lenses, a first imaging lens 505 is arranged below the original table 501 when a relatively small original (small-sized original), e.g., the 35-mm film F1 is placed on the original table 501. The first imaging lens 505 images the image information of the 35-mm film F1 on the surface of a line sensor (CCD) 508, as a photoelectric converting means, arranged below the first imaging lens 505.

The imaging magnification of this imaging lens 505 is set such that the width of the 35-mm film F1 matches the detection line length of the line sensor 508.

A second imaging lens 506 is arranged below the original table 501 when a relatively large original (large-sized original), e.g., the 4×5-inch film F2 is placed on the original table 501. The second imaging lens 506 images the image information of the 4×5-inch film F2 on the surface of the line sensor 508.

The imaging magnification of this second imaging lens 506 is so set that the width of the 4×5-inch film F2 matches the detection line length of the line sensor 508.

A third imaging lens 507 is used for an original film F3 with a size intermediate between the sizes of the original films F1 and F2. The imaging magnification of this third imaging lens 507 is set on the basis of the same design concept as for the first or second imaging lens 505 or 506.

In the conventional image reading apparatus as mentioned above, the first, second, and third imaging lenses 505, 506, and 507 are so supported as to be switched below the original table 501 in FIG. 1. For example, the imaging lenses 505, 506, and 507 are switched in accordance with the size of a given original film F to image the image information of that original film F on the surface of the line sensor 508.

Simultaneously, the line sensor 508 is moved to scan by a linear moving mechanism (not shown) in the direction (subscan direction) indicated by an arrow A0 in FIG. 1 in a plane parallel to the original table 501, thereby two-dimensionally reading the image information of the original film F of that size.

Note that, for example, the switching between the imaging lenses is manually performed by an operator while checking the size of the original film F to be used.

In the conventional image reading apparatus illustrated in FIG. 1, the light source 503 used as an illuminating means has an illumination region set on the basis of the large-sized original F2. In addition, in the imaging means 510, one of a plurality of the imaging lenses is selectively used in accordance with the original size. Consequently, the following problems are encountered.

1. A large light source is required to two-dimensionally, evenly illuminate the image information of an original of a large size (large-sized original) throughout the entire region to be read. In addition, the size of a power source for supplying power to this light source is also increased to increase consumption power. Also, since the field angle of an illumination region must have a size corresponding to the length of the diagonal of an original, the illuminating optical path length increases accordingly. Consequently, the illuminating means becomes large and expensive.

2. In reading the image information of originals by switching a plurality of imaging lenses in accordance with the sizes of the originals, it is necessary to set the distances between the imaging lens, the original, and the photoelectric converting means, and the right angle of the optical axis to the original surface with an extremely high accuracy, in order to maintain the quality of the read images with a high accuracy. To this end, the imaging system must be supported by a highly rigid structure, and a positioning mechanism processed extremely precisely is required. The result is a very large, expensive structure.

SUMMARY OF THE INVENTION

It is an object of the present invention to provide an image reading apparatus in which, even if a wide variety of original sizes are to be handled, the space of an illuminating means can be small since individual elements constituting the apparatus are properly set, and in which consumption power can be reduced by raising the illumination efficiency, and imaging performance can be maintained with a high accuracy.

An image reading apparatus of the present invention is characterized in that a plurality of objects having different regions to be illuminated can be illuminated with a light beam from an illuminating means, and the image information of the objects thus illuminated is guided to imaging means arranged in different optical paths in correspondence with the objects, and is imaged on the surface of a single photoelectric converting means by the individual imaging means, thereby allowing the photoelectric converting means to read the image information of the objects.

Another image reading apparatus of the present invention includes a first optical system in which a first object is illuminated with a light beam from an illuminating means and the image information of the first object thus illuminated is imaged on the surface of a photoelectric converting means by a first imaging lens, and a second optical system in which the light beam from the illuminating means is guided by an optical path switching means to a second optical path, which is different from a first optical path of the first optical system, to illuminate a second object having a region to be illuminated different from that of the first object, via an optical means having at least one optical element which is provided in the second optical path and has anisotropy in converging/diverging properties, and the image information of the second object thus illuminated is imaged on the surface of the photoelectric converting element by a second imaging lens provided in the second optical path, wherein the image information of the first or second object is read by displacing the first or second object and the photoelectric converting means relative to each other.

Still another image reading apparatus of the present invention includes a first optical system in which a first object supported by an original support member is illuminated with a light beam from an illuminating means via an optical means having at least one optical element with anisotropy in converging/diverging properties, and the image information of the first object thus illuminated is imaged by a first imaging lens on the surface of a photoelectric converting means via a second optical path switching means, and a second optical system in which the light beam from the illuminating means is guided by a first optical path switching means to a second optical path, which is different from a first optical path of the first optical system, to illuminate a second object supported by the original support member and having a region to be illuminated different from that of the first object, via an optical means having at least one optical element which is provided in the second optical path and has anisotropy in converging/diverging properties, and the image information of the second object thus illuminated is imaged on the surface of the photoelectric converting means by a second imaging lens provided in the second optical path, wherein the image information of the first or second object is read by displacing the original support member.

Still another image reading apparatus of the present invention includes a first optical system in which a light beam from a light source means is illuminated on a first object placed on an original support table by an illuminating means having an optical means having at least one optical element with anisotropy in converging/diverging properties, and the image information of the first object thus illuminated is imaged on the surface of a photoelectric converting means by a first imaging lens via a scanning means and an optical path switching means, and a second optical system in which a second object placed on the original support table and having a region to be illuminated different from that of the first object is illuminated, and the image information of the second object thus illuminated is imaged on the surface of the photoelectric converting means by a second imaging lens provided in an optical path different from an optical path of the first imaging lens via the scanning means, wherein the image information of the first or second object is read by displacing the illuminating means and the scanning means.

Still another image reading apparatus of the present invention includes illuminating means for illuminating a first object and a second object different in a region to be illuminated from the first object, photoelectric converting means, first imaging means for imaging image information of the first object on the photoelectric converting means, and second imaging means for imaging image information of the second object on the photoelectric converting means, the second imaging means being arranged in an optical path different from an optical path of the first imaging means.

Still another image reading apparatus of the present invention includes illuminating means for selectively illuminating a first object and a second object different in a region to be illuminated from the first object, the illuminating means having at least one optical element which is arranged in an optical path for illuminating the second object and has anisotropy in converging/diverging properties, photoelectric converting means, first imaging means for imaging image information of the first object on the photoelectric converting means, second imaging means for imaging image information of the second object on the photoelectric converting means, the second imaging means being arranged in an optical path different from an optical path of the first imaging means, and means for displacing the first and second object and the photoelectric converting means relative to each other.

Still another image reading apparatus of the present invention includes illuminating means for selectively illuminating a first object and a second object different in a region to be illuminated from the first object, the illuminating means having at least one optical element which is arranged in an optical path for illuminating the second object and has anisotropy in converging/diverging properties, original support means for supporting the first and second objects, photoelectric converting means, first imaging means for imaging image information of the first object on the photoelectric converting means, second imaging means for imaging image information of the second object on the photoelectric converting means, the second imaging means being arranged in an optical path different from an optical path of the first imaging means, and means for displacing the original support means.

Still another image reading apparatus of the present invention includes illuminating means having at least one optical element with anisotropy in converging/diverging properties, photoelectric converting means, original support means for supporting a first object and a second object different in a region to be illuminated from the first object, first imaging means for imaging image information of the first object on the photoelectric converting means, second imaging means for imaging image information of the second object on the photoelectric converting means, the second imaging means being arranged in an optical path different from an optical path of the first imaging means, scanning means for scanning the image information of the first object or the image information of the second object, and means for displacing the illuminating means and the scanning means.

Still another image reading apparatus of the present invention includes illuminating means, switching means for switching light beams from the illuminating means in order to selectively illuminate a first illumination region and a second illumination region different from the first illumination region, first imaging means for imaging image information of the first illumination region, second imaging means for imaging image information of the second illumination region, and detecting means for selectively detecting the image information of the first illumination region and the image information of the second illumination region.

Still another image reading apparatus of the present invention includes illuminating means for selectively illuminating a first illumination region and a second illumination region different from the first illumination region, first imaging means for imaging image information of the first illumination region, second imaging means for imaging image information of the second illumination region, and detecting means for selectively detecting the image information of the first illumination region and the image information of the second illumination region.

BRIEF DESCRIPTION OF THE DRAWINGS

FIGS. 4A and 4B are schematic views of the main parts showing the principle of an arrangement of an optical system of the first embodiment of the present invention;

FIG. 8 is a top view of the main parts when the CCD carriage of the first embodiment of the present invention is viewed from the above;

FIG. 9 is a block diagram showing main parts of a control system of the first embodiment of the present invention;

FIGS. 10A and 10B are schematic views of the main parts showing the principle of another arrangement of the optical system of the first embodiment of the present invention;

FIGS. 11A and 11B are schematic views of the main parts showing the principle of still another arrangement of the optical system of the first embodiment of the present invention;

DETAILED DESCRIPTION OF THE PREFERRED EMBODIMENTS

Preferred embodiments of an image reading apparatus of the present invention will be described below with reference to the accompanying drawings.

Figure 1:
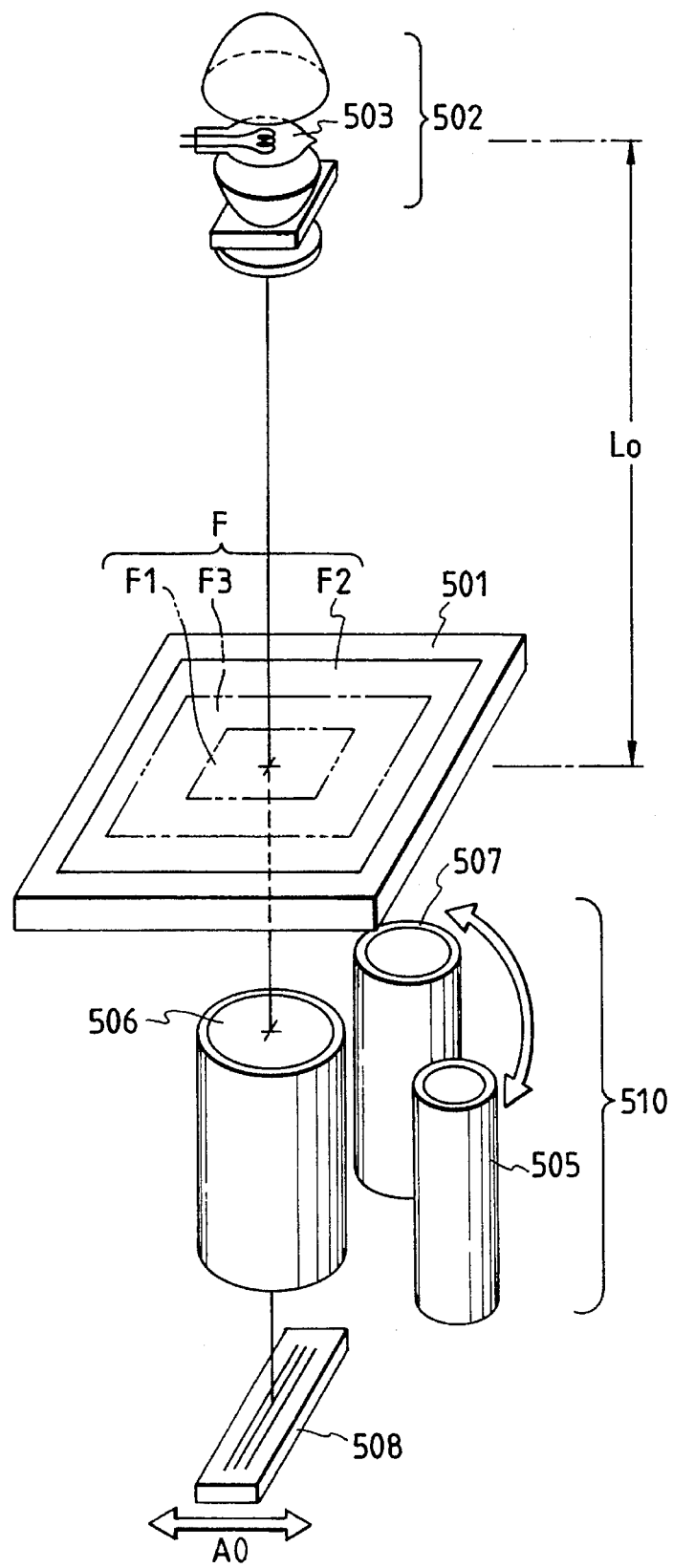
FIG. 1 is a schematic view showing main parts of a conventional image reading apparatus.
Figure 2:
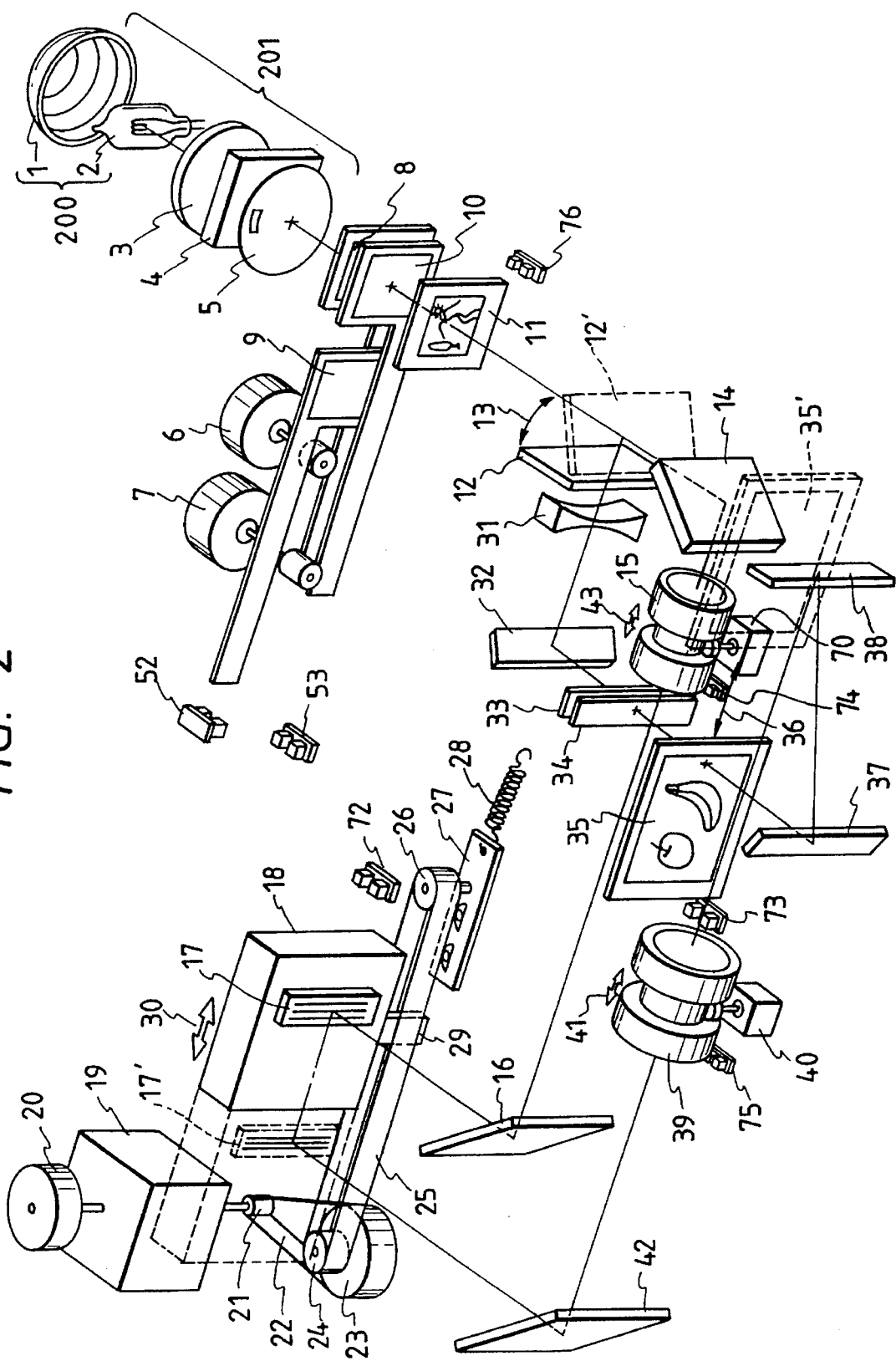
FIG. 2 is a perspective view showing main parts of the first embodiment in which the present invention is applied to an image reading apparatus for transmission originals.

FIG. 2 is a perspective view showing main parts of the first embodiment in which the present invention is applied to an image reading apparatus for transmission originals.

Figure 3:
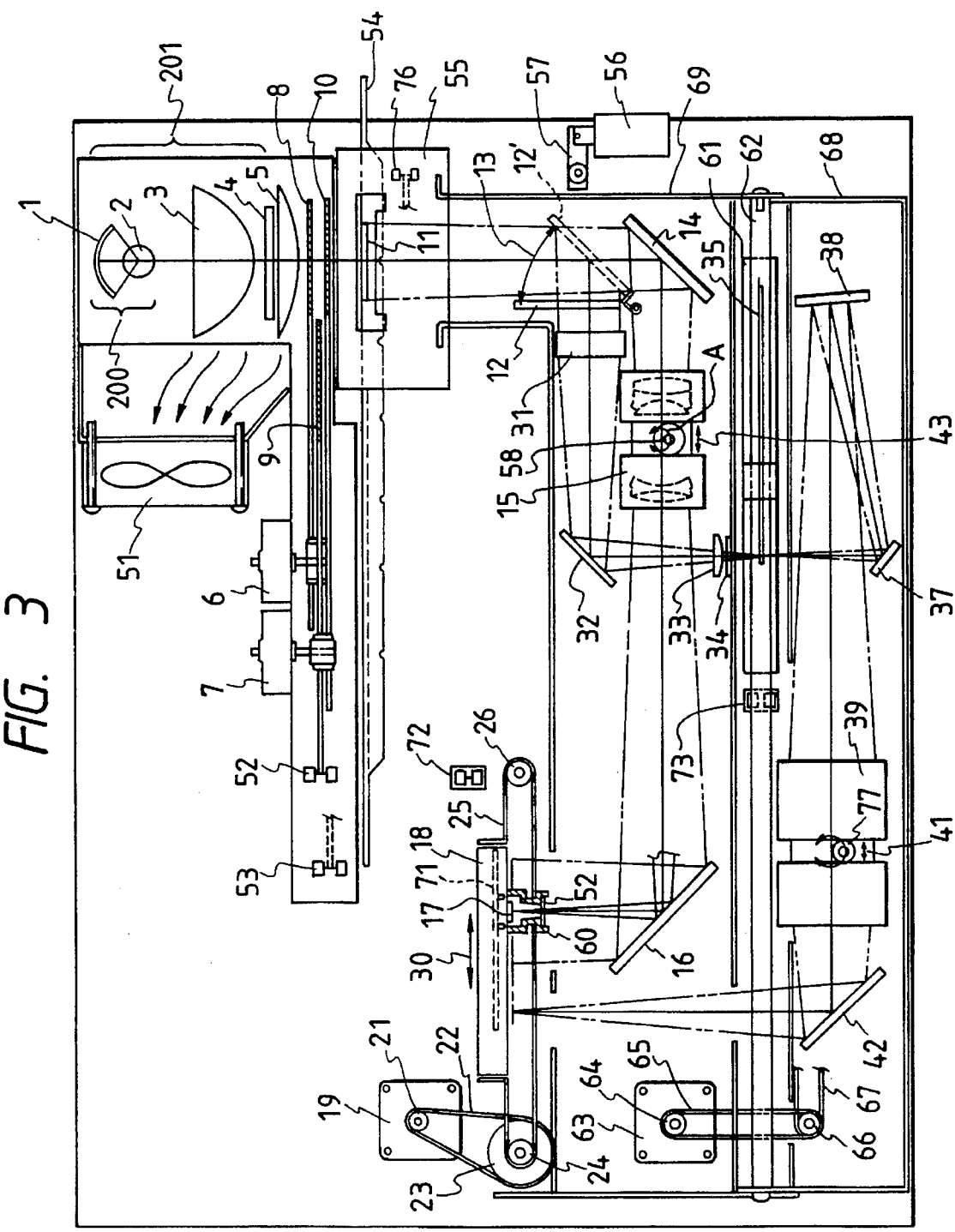
FIG. 3 is a top view of the main parts when the first embodiment shown in FIG. 2 is viewed from the above.

FIG. 3 is a top view of the main parts when the first embodiment illustrated in FIG. 2 is viewed from the above.

In this embodiment, as will be described later, a transmission 35-mm film is used as a first original of small size (first object), and a transmission 4×5-inch film (to be referred to as a 4×5 film hereinafter) is used as a second original of large size (second object). The overall arrangement of this embodiment is described below by using these originals.

Assume, in this embodiment, that the same direction as the direction of an array of a plurality of pixels (light-receiving elements) of a photoelectric converting means (CCD) 17 (to be described later) is a main scan direction, and a direction perpendicular to this direction is a subscan direction, in a plane perpendicular to the optical axis.

Referring to FIGS. 2 and 3, a light source means 200 consists of a light source (lamp) 2 and a reflecting plate (reflecting shade) 1 for effectively condensing a light beam (illuminating light beam), which is emitted from the light source 2 in a direction opposite to a film (object), toward the film. The light source means 200 illuminates a 35-mm film (first object) 11 or a 4×5-inch film (second object) 35 with a predetermined optimal light quantity.

A condenser lens 3 constitutes a Köhler's illumination system. A heat insulating glass 4 cuts an unnecessary light beam in an infrared light region emitted from the light source and thereby protects a film or a CCD (line sensor) to be described later. A field lens 5 helps the condenser lens 3 to perform the optical function.

In this embodiment, the light source 2 and the pupil of a 35-mm film imaging lens 15 constitute a Köhler's illumination system in which they have an optical conjugate relation with the aid of the condenser lens 3. That is, the condenser lens 3 forms an image of the light source 2 on the pupil of the 35-mm film imaging lens 15, as will be described later. Note that the elements denoted by reference numerals 1 to 5 mentioned above constitute an illuminating means 201.

A cyan filter 8 compensates for the color of a base film when a negative film is used as an original. An ND filter 9 compensates for the quantity of an illuminating light beam when a film original is a positive film. In this embodiment, these two filters 8 and 9 are so controlled as to be located exclusive to each other in an optical path by using, e.g., a filter switching motor 6.

The filter switching motor 6 is a driving source for performing this exclusive driving. A pinion gear fixed to the output shaft of this filter switching motor 6 meshes with a rack provided in each of holding members for holding the cyan filter 8 and the ND filter 9. In this embodiment, the exclusive driving of the cyan filter 8 and the ND filter 9 is effectuated by switching the rotating directions of the filter switching motor 6.

A diffusing plate 10 diffuses a light beam (illuminating light beam) from the illuminating means 201 when the 35-mm film 11 is to be illuminated. This makes grains of the 35-mm film 11 or dust or the like adhered to the film 11 inconspicuous.

In this embodiment, one of the cyan filter 8 and the ND filter 9 described above is controlled to be located in the illuminating optical path even in illuminating the 4×5 film 35 (to be described later). However, the diffusing plate 10 is retracted outside the optical path when the 4×5 film 35 is to be used as an original. This is so because, if the diffusing plate 10 is in the illuminating optical path, the quantity of the illuminating light beam reduces to 1/10 to 1/20 that when the diffusing plate 10 is absent, before the light beam reaches the 4×5 film 35. The diffusing plate 10 is moved into the optical path by a diffusing plate driving motor 7. As with the filter switching motor 6 mentioned above, this diffusing plate driving motor 7 also includes a rack-and-pinion mechanism.

The surface of the transmission 35-mm film 11 as the first object is illuminated two-dimensionally with the illuminating light beam from the illuminating means 201.

A filter sensor 52 senses which of the cyan filter 8 and the ND filter 9 is in the illuminating optical path. A diffusing plate sensor 53 senses whether the diffusing plate is currently located in the illuminating optical path.

A film sensor 76 senses whether the 35-mm film 11 is present in the illuminating optical path. In this embodiment, the 35-mm film 11 is moved outside the optical path when the 4×5 film 35 is to be illuminated. If, for example, the 35-mm film 11 is present in the illuminating optical path when the operation mode is switched to the one for reading the 4×5 film 35, a message indicating this is displayed for an operator.

Individual optical elements are described below along the optical path for reading the 35-mm film 11.

A pivotal optical path switching mirror 12 is an optical path switching means. When the mirror 12 pivots to the position indicated by the solid lines in FIGS. 2 and 3, a light beam (illuminating light beam) which has illuminated (has been transmitted through) the 35-mm film 11 is directed toward the 35-mm film imaging lens (first imaging lens) 15. When the mirror 12 pivots to a position 12' indicated by the dotted lines in FIGS. 2 and 3, the light beam is guided toward the 4×5 film 35.

A first optical path bending mirror 14 bends the light beam transmitted through the 35-mm film 11 toward the 35-mm film imaging lens 15. The 35-mm film imaging lens 15 images the image information of the 35-mm film 11 on the surface of the CCD (line sensor) 17 as a photoelectric converting means (to be described later). A second optical path bending mirror 16 bends the light beam passing through the 35-mm film imaging lens 15 toward the CCD 17.

The CCD 17 consists of a photoelectric converting device in which a plurality of light-receiving elements (pixels) are arranged one-dimensionally in the main scan direction, and converts the image information of an original that is imaged as described above into an electrical signal. The CCD 17 is fixed on a CCD carriage 18 (to be described later). Note that the photoelectric converting means in this embodiment can also be constituted by a one-line sensor or by a three-line sensor in which three line sensors for red (R), green (G), and blue (B) are arranged parallel to each other on the surface of the same substrate.

The CCD carriage 18 is supported on a lower rail 101 and an upper rail 102 shown in FIG. 5 (to be described later) and can be moved in the direction (subscan direction) indicated by an arrow 30 in FIGS. 2 and 3 by a linear moving mechanism (not shown).

In this embodiment, as will be discussed later, the axial direction of the lower and upper rails 101 and 102 is parallel to the optical axis of the 35-mm film imaging lens 15, and the second optical path bending mirror 16 bends the optical axis at a right angle. Therefore, if an error (difference) is present in the imaging position of the image of a 35-mm film, the second optical path bending mirror 16 is moved in the direction (subscan direction) indicated by the arrow 30, and the scanning range of the CCD carriage 18 is shifted by an amount corresponding to this movement. Consequently, the imaging state (optical path length) of that optical system (first optical system) can be adjusted. With this simple adjusting mechanism, it is possible to adjust the optical path length of the optical system.

Individual optical elements after the optical path switching mirror 12 are described along the optical path for reading the 4×5 film 35.

A cylindrical lens 31 is an anamorphic optical element and has a negative refracting power in only a predetermined direction (main scan direction). The cylindrical lens 31 in this embodiment diverges the light beam (illuminating light beam) of Köhler's illumination in only the main scan direction. The lens 31 is arranged near a position at which the aerial image of the light source 2 is formed by the condenser lens 3.

A third optical path bending mirror 32 bends the illuminating light beam passing through the cylindrical lens 31 toward the 4×5 film 35. A concentric Fresnel lens (optical element) 33 efficiently converges the illuminating light beam, which is diverged in the main scan direction, on a 4×5 film imaging lens 39 (to be described later). A diffusing plate 34 has an optical function similar to that of the diffusing plate 10 for the 35-mm film 11.

The transmission 4×5 film 35 is a second object movable in the subscan direction. The length, in the main scan direction, of the region to be illuminated of this 4×5 film 35 is larger than the length, in the main scan direction, of the region to be illuminated of the 35-mm film 11.

In this embodiment with the above arrangement, the light beam is converged on a linear region (line region) in the main scan direction of the 4×5 film 35 when the film 35 is to be illuminated.

That is, one region (linear region) of the 4×5 film 35 is illuminated with a band-like light beam which is wide in the main scan direction and narrow in the subscan direction in the plane perpendicular to the optical axis.

Fourth and fifth optical path bending mirrors 37 and 38 bend the light beam (transmitted light beam) which has illuminated the 4×5 film 35 in a predetermined direction to guide the light beam toward a 4×5 film imaging lens (second imaging lens) 39. The 4×5 film imaging lens 39 images the image information of the 4×5 film 35 on the surface of the CCD 17 via a sixth optical path bending mirror 42.

Note that, in this embodiment, the elements from the illuminating means 201 to the CCD 17 via the 35-mm film imaging lens 15 constitute the first optical system, and the elements from the illuminating means 201 to the CCD 17 via the optical path switching mirror 12 and the 4×5 film imaging lens 39 constitute the second optical system.

When the 4×5 film 35 is to be read in this embodiment, the CCD carriage 18 is moved in the subscan direction by the linear moving mechanism so that the CCD 17 is located at a position 17' indicated by the dotted lines in FIG. 2, and the CCD 17 is held at that position.

When the 4×5 film 35 is to be read, the diffusing plate 10 and the 35-mm film 11 are retracted outside the optical path as mentioned earlier, and the optical path switching mirror 12 is pivoted to the position 12' indicated by the dotted lines in FIGS. 2 and 3.

The 4×5 film 35 of this embodiment can be moved to a position 35' indicated by the dotted lines in FIG. 2 by a linear moving mechanism (not shown). Consequently, an image of the light beam (transmitted light) from the linear region in the main scan direction of the 4×5 film 35 illuminated with the illuminating light beam is formed on the surface of the CCD 17 by the 4×5 film imaging lens 39 via the fourth and fifth optical path bending mirrors 37 and 38, and thereby the image information of the 4×5 film 35 is sequentially read.

In this embodiment as discussed above, when the 4×5 film as a large-sized original is to be illuminated, an illuminating light beam is converged on only a minimum region that the CCD 17 as a photoelectric converting means requires to scan, unlike in two-dimensional illumination for the 35-mm film 11. This allows extremely efficient illumination using the illuminating light beam from the same light source 2 of small size, without requiring any large light source.

Additionally, the reading scan line length on the 4×5 film 35, i.e., the line width of an actual image plane of the 4×5 film 35 need only be assumed as the maximum length of a region to be illuminated. Therefore, the maximum length of a region to be illuminated can be decreased compared to that in a conventional two-dimensional illumination method. This makes it possible to set a short illuminating optical path length for enlarging the illuminating light beam from the light source 2.

Furthermore, to correct an error (difference) in the imaging position of the 4×5 film image, as in the first optical system for reading the image information of the 35-mm film 11 as mentioned above, it is only necessary to move the sixth optical path bending mirror 42 in the direction (subscan direction) indicated by the arrow 30 by a predetermined amount and to change the waiting position of the CCD 17 in accordance with the amount of the movement. This permits the simple adjusting mechanism to adjust the optical path length (imaging state) of the second optical path.

Elements constituting a focus adjusting mechanism are described below.

A 35-mm film lens moving cam 58 is supported by a roller as a rotary member capable of pivoting. This roller is fitted in a groove of a lens-barrel. The 35-mm film lens moving cam 58 is applied with a torque by a 35-mm film lens motor 70. However, since the rotation center of the roller and the output shaft of the 35-mm film lens motor 70 are off-centered, the center of the 35-mm film lens moving cam 58 rotates along the direction indicated by an arrow A in FIG. 2 as the 35-mm film lens motor 70 rotates. Consequently, the 35-mm film imaging lens 15 moves in the direction indicated by an arrow 43 in FIG. 3. A 35-mm film lens moving cam sensor 74 senses the phase of the 35-mm film lens moving cam 58.

A motor 40 is for the 4×5 film lens. A 4×5 film lens moving cam sensor 75 senses the home position of the 4×5 film imaging lens 39. In the same manner as discussed above, the 4×5 film imaging lens 39 is driven (moved) in the direction indicated by an arrow 41 by a 4×5 film lens moving cam 77. A 4×5 film carriage home position sensor 73 senses the home position of the 4×5 film 35.

Elements constituting a scanning system associated with the CCD carriage 18 are described below.

A carriage driving motor 19 drives (moves) the CCD carriage 18 in the subscan direction. In this embodiment, a stepping motor is used as the carriage driving motor 19. To prevent vibrations inherent in the stepping motor, a magnet type damper flywheel 20 is attached to the motor shaft. The flywheel 20 is coupled to the motor shaft with a predetermined torque resulting from a magnetic force.

A timing belt motor pulley 21 is fixed to the motor shaft of the carriage driving motor 19. A first, large-diameter reduction pulley 23 and a second, small-diameter reduction pulley 24 consist of timing belt motor pulleys formed integrally. A reduction belt 22 is looped between the motor pulley 21 and the first reduction pulley 23.

Elements constituting a driving system for moving the 4×5 film 35 are described below.

A 4×5 film carriage 61, into which a rail shaft 62 is so inserted as to allow the carriage 61 to move, scans the 4×5 film 35 in the subscan direction. The peripheral edge of the 4×5 film 35 is clamped by a 4×5 film carrier (not shown), so the film 35 is detachably held by the 4×5 film carriage 61 via the 4×5 film carrier.

A 4×5 film driving motor 63 drives the 4×5 film carriage 61. A 4×5 film motor pulley 64, a 4×5 film reduction pulley belt 65, a 4×5 film reduction pulley 66, and a 4×5 film driving belt 67 are also provided.

The 4×5 film carriage home position sensor 73 senses a predetermined position of the 4×5 film carriage 61, determining the home position of the 4×5 film carriage 61. The 4×5 film carriage 61 can be moved in the direction indicated by an arrow 36 in FIG. 2 by the 4×5 film driving motor 63.

Other constituting elements of this apparatus are described below.

A heat radiating fan 51 radiates heat from inside the apparatus so as to prevent temperature rise in optical parts heated by the light source 2. A film carrier 54 for holding the 35-mm film 11 detachably engages with a magazine 55. A mirror switching solenoid 56 drives the optical path switching mirror 12, and a mirror switching link 57 has a similar function. Note that the apparatus normally mounts a 35-mm film frame 69, and a 4×5 film frame 68 is detachably mounted. This allows an operation using the 35-mm frame alone.

FIGS. 4A and 4B are schematic views of the main parts for explaining the principle of an arrangement related to the optical system of this embodiment. FIG. 4A is a sectional view (a section in the subscan direction) of the main parts when the optical system is viewed from the above, and FIG. 4B is a sectional view (a section in the main scan direction) of the main parts when the optical system is viewed sideways. In FIGS. 4A and 4B, the same reference numerals as in FIGS. 2 and 3 denote the same parts.

Referring to FIGS. 4A and 4B, when the optical path switching mirror 12 pivots outside the optical path as indicated by the solid lines, a light beam emitted by the light source 2 two-dimensionally illuminates the 35-mm film 11 via the illuminating means such as the condenser lens 3, and the image information of the 35-mm film 11 thus illuminated is imaged on the surface of the CCD (line sensor) 17 by the 35-mm film imaging lens 15. At this time, the aerial image of the light source 2 and the pupil of the 35-mm film imaging lens 15 constitute a Köhler's illuminating system in which they have an optical conjugate relationship with the aid of the condenser lens 3.

When the optical path switching mirror 12 pivots into the optical path as indicated by the dotted lines in FIGS. 4A and 4B, the light beam is diverged in only one direction, i.e., a direction (main scan direction) parallel to the plane of the paper illustrated in FIG. 4B by the cylindrical lens 31 consisting of the anamorphic optical element arranged near the aerial image of the light source 3, which is formed by the condenser lens 3, and having a negative refracting power. The diverged light beam is then converged by the concentric Fresnel lens 33 to illuminate the 4×5 film 35 along a line (in the same direction as the direction of the array of the elements of the CCD) extending in the main scan direction.

The image information of the 4×5 film 35 thus illuminated is imaged on the surface of the CCD 17 by the 4×5 film imaging lens 39. In this case, the aerial image of the light source 2 and the pupil of the 4×5 film imaging lens 39 constitute a Köhler's illuminating system in which they have an optical conjugate relationship via of the Fresnel lens 33.

Referring back to FIGS. 2 and 3, auto-focusing operations of the first and second optical systems are described below.

In this embodiment, the 35-mm film imaging lens 15 is so held as to be movable in the direction of the arrow 43 in order to perform an auto-focusing operation. Likewise, the 4×5 film imaging lens 39 is so held as to be movable in the direction of the arrow 41 to perform an auto-focusing operation.

In this embodiment, a control unit 45 shown in FIG. 9 (to be described later) extracts image data from the CCD 17 while moving the imaging lens 15 or 39 back and forth along the optical axis, i.e., in the direction of the arrow 43 or 41, respectively, and calculates the quantity of contrast of that image data for each unit moving amount of the back-and-forth movement. The control unit 45 stores the position of the imaging lens 15 or 39, at which the highest contrast is obtained, as an in-focus position. During the back-and-forth movement in the next period, the control unit 45 holds the imaging lens 15 or 39 at this in-focus position, thereby obtaining an in-focus projected image of the film 11 or 35, respectively.

An arrangement of a subscanning section is described below with reference to FIGS. 5, 6, 7, and 8.

Figure 5:
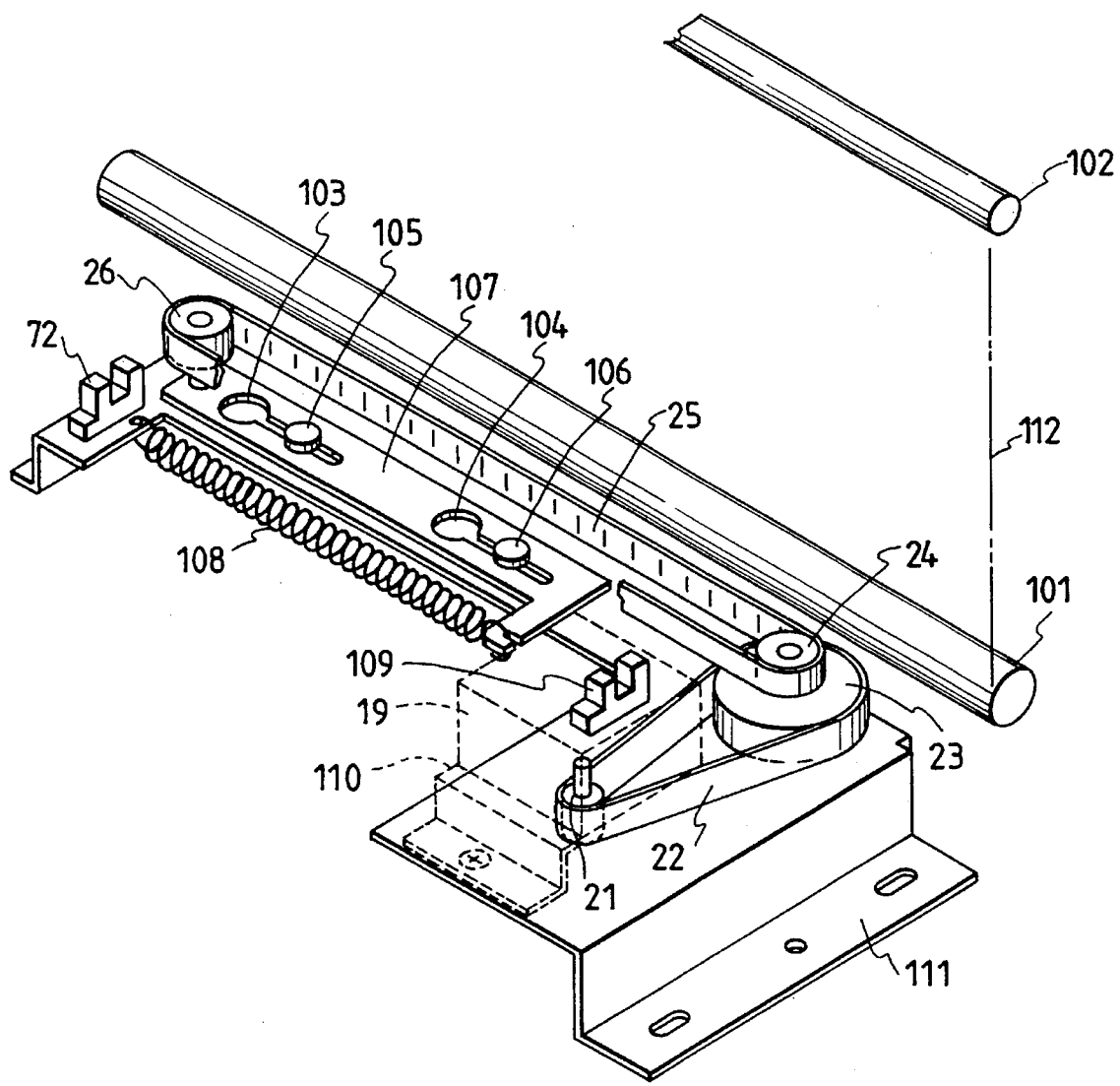
FIG. 5 is a perspective view showing main parts of a CCD driving unit of the first embodiment of the present invention.
Figure 6:
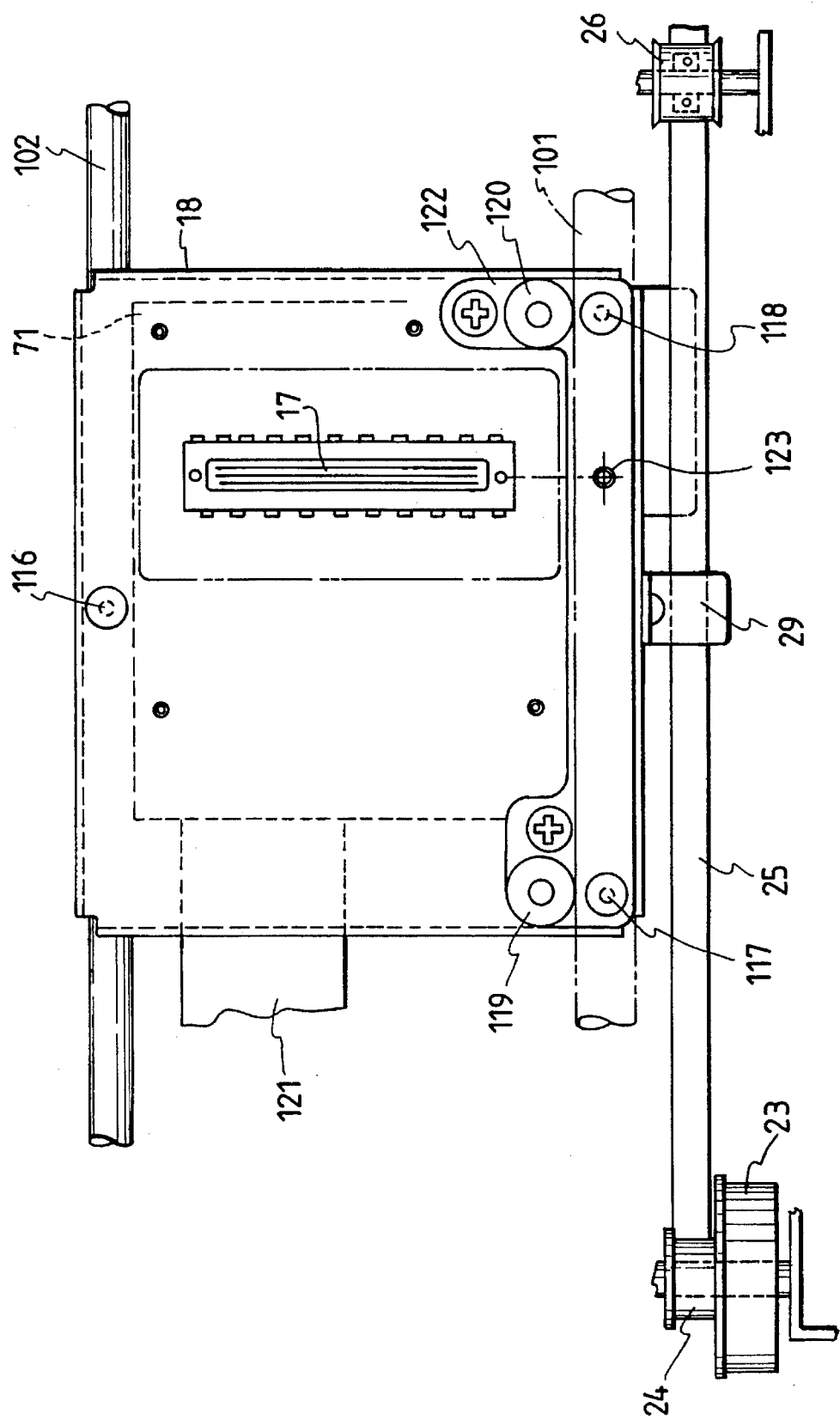
FIG. 6 is a view for explaining main parts when a CCD carriage of the first embodiment of the present invention is viewed from the side of a CCD mounting surface.
Figure 7:
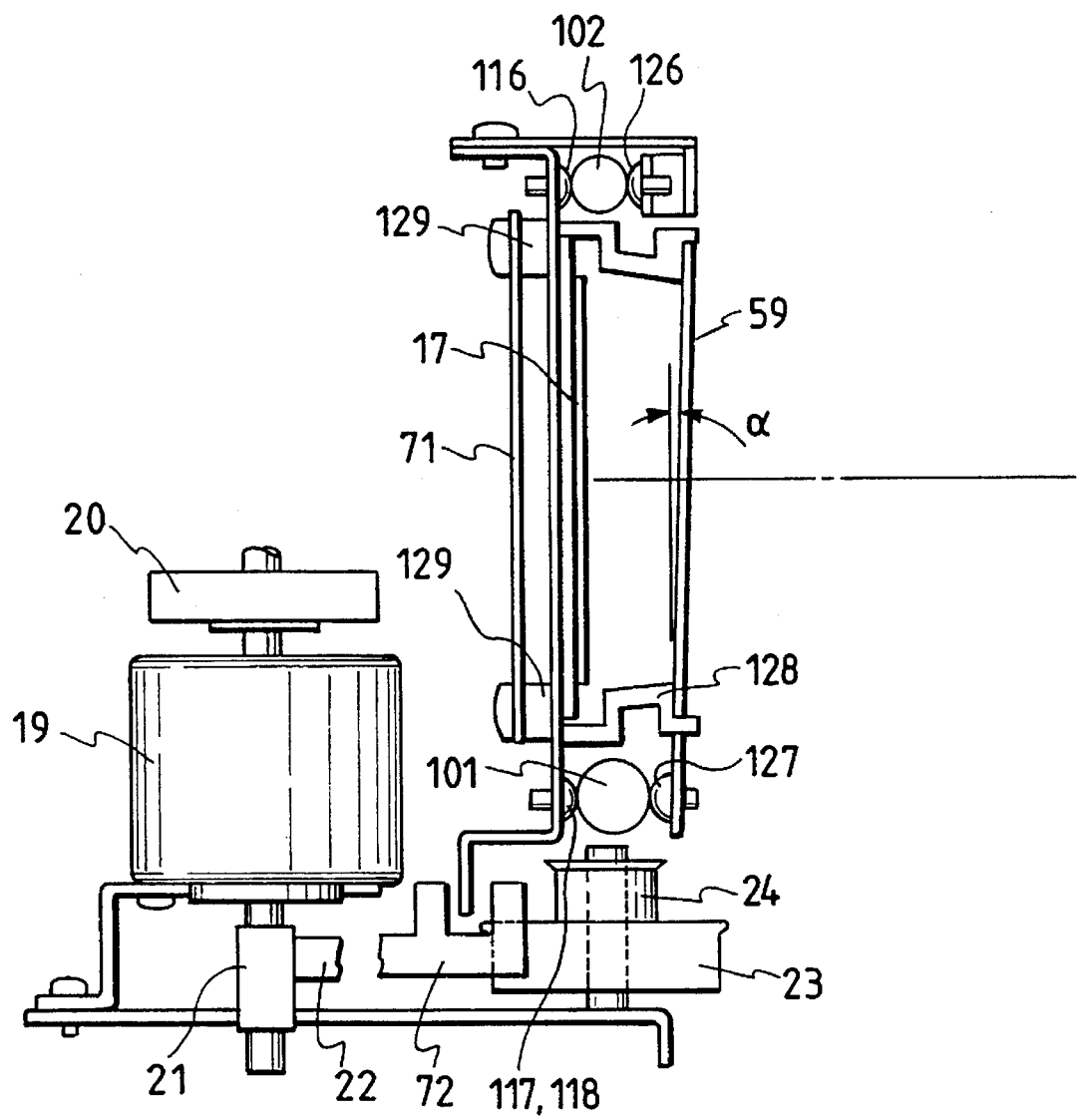
FIG. 7 is a sectional view of the main parts when the CCD carriage of the first embodiment of the present invention is viewed sideways.

FIG. 5 is a perspective view of main parts showing a CCD driving unit for driving the CCD carriage 18. FIG. 6 is a view for explaining the main parts when the CCD carriage 18 is viewed from the side of a surface for mounting the CCD 17. FIG. 7 is a sectional view of the main parts when the CCD carriage 18 is viewed sideways. FIG. 8 is a top view of the main parts when the CCD carriage 18 is viewed from the above. In FIGS. 5 to 8, the same reference numerals as in FIG. 2 denote the same parts.

Referring to FIG. 5, the lower and upper rails 101 and 102 are for moving the CCD carriage in the subscan direction. A CCD carriage home position sensor 72 senses a predetermined position of the CCD carriage to determine the home position of the CCD carriage. A carriage driving belt 25 is looped between the second reduction pulley 24 and an idler pulley 26. The idler pulley 26 is biased by a tension spring 108 in a direction in which a tension is given to the carriage driving belt 25.

The idler pulley 26 is fixed to a slide plate 107 which is slidably fixed by slide pins 105 and 106 fixed to a driving unit base 111. The slide pins 105 and 106 are fitted in slide holes 103 and 104, respectively. To improve the workability in assembly, portions larger than guide shafts are formed at the ends of the slide holes 103 and 104 so that the members can be disassembled at these portions.

The reduction belt 22 is looped between the motor pulley 21 and the first reduction pulley 23. The first and second reduction pulleys 23 and 24 are integrally coupled with no play. The carriage driving motor 19 is a stepping motor. The motor 19 is set such that the distance the CCD carriage is moved per driving oscillation pulse is a unit fraction of the length of the pixels in the subscan direction of the CCD 17. This makes a start/stop operation easier to effectuate, which is to be executed in intermittent scan reading required when this apparatus is connected to a personal computer or the like.

A motor mounting plate 110 consists of a vibration damping steel plate. The motor mounting plate 110 mounts the carriage driving motor 19 and prevents vibrations of the carriage driving motor 19 from being transmitted to the CCD to adversely affect images. TN belts (a registered trademark; available from Bando Kagaku K.K.) are used as the reduction belt 22 and the carriage driving belt 25. This TN belt employs a soft rubber material whose belt teeth have a triangular sectional shape with an apical angle of 70°, in order to minimize backlash. The TN belts are extremely effective compared to conventional belts with general tooth shapes, when used in portions required to transmit both clockwise and counterclockwise rotations and move accurately.

An imaging plane 112, on which the image information of each original film is imaged, is a common tangent plane of the lower and upper rails 101 and 102. The imaging plane 112 is scanned in the subscan direction so as to be in agreement with the light-receiving surface of the CCD. This is also shown in FIG. 7. Consequently, it is possible to minimize any shifts between pixels in the main scan direction even if the CCD is inclined from the axis of the lower and upper rails 101 and 102 or from an axis parallel to the axis of the rails.

Referring to FIG. 6, a CCD driver 71 transmits an image signal as an analog signal through a CCD connection cable 121. A belt engaging unit 29 is fixed to the CCD carriage 18. An end portion of the belt engaging unit 29 is fixed to the carriage driving belt 25. That is, the carriage driving belt 25 and the CCD carriage 18 are coupled at a given point near the rail. The CCD connection cable 121 is made of a flexible substrate and transmits the analog signal from the CCD 17 to the control unit 45 (to be described later).

Sliders 116, 117, and 118 horizontally clamp the lower and upper rails 101 and 102 for holding the CCD carriage 18. The sliders 116, 117, and 118 are fixed to the CCD carriage 18. Also, the reference sides and the opposite sides of these sliders clamp the lower and upper rails 101 and 102 with elasticity. This is also illustrated in FIG. 7.

The sliders 116, 117, and 118 are coated with a fluorine-based resin, such as PTFA, in order to minimize the frictional force with the lower and upper rails 101 and 102.

Ball bearings 119 and 120 roll on the lower rail 101. The ball bearings 119 and 120 support the CCD carriage 18 in a direction perpendicular to the plane of the paper for the reason to be explained below. That is, since the CCD carriage 18 is applied with a load in the direction perpendicular to the plane of the paper, the load is increased compared to that in positioning in the horizontal direction. Therefore, the load (frictional force in the subscan direction) for scan in the subscan direction is increased if sliding is used.

Shafts pressed into the ball bearings 119 and 120 are fixed to the CCD carriage 18 via a right-angle correcting plate 122. The right-angle correcting plate 122 is so mounted as to be rotatable about a rotation center 123 provided immediately below the center, in the subscan direction, of the CCD 17. The right-angle correcting plate 122 can adjust the lower and upper rails 101 and 102 for scan in the subscan direction to have accurately 90°. Also, since the rotation center of the right-angle correcting plate 122 is provided immediately below the CCD 17 in the line direction (main scan direction), only the rotation can be adjusted independent of the difference between levels.

The shafts pressed into the ball bearings 119 and 120 are straight shafts with no steps, whose diameters are highly accurately controlled by centerless grinding. This makes it possible to take advantage of the full performance of the ball bearings.

A substrate grounding member 129 (see FIGS. 7 and 8) brings the CCD driver 71 into electrical contact with the CCD carriage 18. The CCD carriage 18 is also in electrical contact with the lower and upper rails 101 and 102 via the shafts pressed into the ball bearings 119 and 120 and the ball bearings 119 and 120. For this purpose, conductive ball bearings or ball bearings with a conductive grease are used as the ball bearings 119 and 120.

The lower and upper rails 101 and 102 supporting the CCD carriage 18 are coupled to an optical unit (not shown) and eventually grounded on the entire apparatus. Note that signal grounding of the output analog signal from the CCD 17 is done by the CCD connection cable 121.

The idler pulley 26 has an internal ball bearing for the reason to be explained below. That is, a force twice as large as the tension of the belt is applied on the idler pulley 26, and, if the rotational load in this portion is high, the tension of the belt changes largely depending on the rotating direction of the carriage driving motor 19 shown in FIG. 7. This results in the difference between forward and backward movements in the scan of the CCD 17 in the subscan direction, leading to an unstable operation. Therefore, the rotational load on the idler pulley 26 must be minimized in order to stably move the CCD carriage 18 back and forth. For this reason, a highly accurate ball bearing consisting of a conductive material is used in this portion.

Referring to FIG. 7, an infrared cut filter 59 is provided immediately before the CCD 17. This infrared cut filter 59 is inclined by an angle α in the direction perpendicular to the plane of the paper, so that the outer surface of the infrared cut filter 59 is not covered with dust or the like.

A CCD cover 128 attaches the infrared cut filter 59 to the CCD carriage and also protects the CCD 17 itself against dust or the like.

Note that the inner surface of the infrared cut filter 59 and the glass of the CCD 17 are sealed by the CCD cover 128, and this prevents adhesion of dust or the like.

The CCD 17 is so mounted as to clamp the CCD carriage 18 together with the CCD driver 71, and is pressed against the CCD carriage. This makes it possible to perform positioning of the CCD 17 and radiate heat generated by the CCD 17 via the CCD carriage. For this purpose, the CCD carriage is made of a black material in order to facilitate the radiation and at the same time prevent diffused reflection.

In FIG. 8, the same reference numerals as in FIGS. 6 and 7 denote the same parts. FIG. 8 is a top view in which the CCD carriage 18 is viewed from the above, as in the top view of FIG. 3.

A control system of the image reading apparatus according to the first embodiment of the present invention is described below with reference to FIG. 9.

FIG. 9 is a block diagram showing main parts of a control system according to the image reading apparatus of the first embodiment of the present invention. In FIG. 9, the same reference numerals as in FIGS. 2 and 3 denote the same parts.

Referring to FIG. 9, a power source 44 supplies power to the control unit 45 (to be described below), a driver 46, a liquid-crystal display 47, the light source 2, and the like. Note that the voltage to be supplied to the light source 2 is controlled by a voltage control signal from the control unit 45.

The control unit 45 is constituted by, e.g., a ROM, a RAM, an image processing circuit, an interface unit, and a CPU. The ROM is a storage device for storing primarily programs for operation procedures. The RAM is a storage device for storing parameters required for control during various operation procedures. The image processing circuit performs arithmetic operations for image data signals. The interface unit obtains matching of signals in transmitting the signals to external equipment. The CPU generally controls these elements so that the elements are synchronized with each other, and performs arithmetic operations and outputs command signals in order to sequentially execute operation procedures of the apparatus.

Upon receiving control signals from the control unit 45, the driver 46 supplies driving power for driving the motors, i.e., the filter switching motor 6, the diffusing plate moving motor 7, the carriage driving motor 19, the 35-mm film lens motor 70, the 4×5 film lens motor 40, and the 4×5 film driving motor 63, and other elements, such as the mirror switching solenoid 56 and the heat radiating fan 51.

The control unit 45 receives the detection signals from the position sensors consisting of photointerrupters, i.e., the filter sensor 52, the diffusing plate sensor 53, the CCD carriage home position sensor 72, the 4×5 film carriage home position sensor 73, the 35-mm film lens moving cam sensor 74, and the 4×5 film lens moving cam sensor 75. The control unit 45 uses these signals to determine the positions of these operating members.

The CCD driver 71 drives the CCD 17 and at the same time extracts image data and transmits the information of the data to the control unit 45. The liquid-crystal display 47 includes a liquid-crystal screen 48, a liquid-crystal screen controller 49, and a light-transmitting touch panel 50 to be overlapped on the liquid-crystal screen 48 in use. The image data detected by the CCD 17 is partially supplied to the liquid-crystal screen controller 49 via the control unit 45, and this partial image data is displayed on the liquid-crystal screen 48.

Also, when an operator operates a predetermined portion of the touch panel 50, an operation signal is generated and transmitted to the control unit 45. Consequently, the control unit 45 performs operation control corresponding to the signal.

Operation procedures for reading different types of originals according to this embodiment are described below.

(1) The following operation is executed to read the 35-mm film 11.

1. First, an operator inserts the 35-mm film 11 held by the film carrier 54 into the magazine 55. The control unit 45 detects this insertion of the 35-mm film 11 in accordance with the detection signal from the film sensor 76 and prepares for the next step. At that time, the optical path switching mirror 12 pivots to the position indicated by the solid lines in FIGS. 2 and 3.

2. Subsequently, the operator enters ID information indicating whether the 35-mm film 11 inserted is a negative film or a positive film from the touch panel 50. On the basis of this signal, the control unit 45 inserts the cyan filter 8, if the film 11 is a negative film, or the ND filter 9, if the film 11 is a positive film, into the illuminating optical path. At the same time, the control unit 45 inserts the diffusing plate 10 into the illuminating optical path. Thereafter, the control unit 45 turns on the light source 2 to cause the illuminating means 201 consisting of the condenser lens 3 or the like to two-dimensionally illuminate the 35-mm film 11. The control unit 45 then transmits the image information of the 35-mm film 11 thus illuminated to the 35-mm film imaging lens 15 via the first optical path bending mirror 14 and causes the 35-mm imaging lens 15 to image this image information on the surface (imaging surface 112) of the CCD 17 via the second optical path bending mirror 16.

3. Subsequently, the carriage driving motor 19 is driven to move the CCD carriage 18 from the home position to substantially the center of the projected image. At the same time, the CCD 17 transfers detection data of the image to the control unit 45.

4. The control unit 45 drives the 35-mm film lens motor 70 to move the 35-mm film imaging lens 15 along the optical axis. Simultaneously, on the basis of the signal from the CCD 17, the control unit 45 calculates the contrast of the image data to check the in-focus position. The control unit 45 then stops the 35-mm film imaging lens 15 at the in-focus position.

5. Subsequently, the control unit 45 again drives the CCD carriage 18 to return it to the home position. Thereafter, the control unit 45 causes the CCD carriage 18 to start scan for image reading, thereby sequentially detecting the image data.

(2) The following operation is executed to read the 4×5 film 35.

1. First, an operator inserts the 4×5 film 35 clamped by the 4×5 film carrier into the 4×5 film carriage 61.

2. The operator then enters ID information indicating whether the 4×5 film 35 inserted is a negative film or a positive film from the touch panel 50. On the basis of this signal, the control unit 45 inserts the cyan filter 8, if the film 35 is a negative film, or the ND filter 9, if the film 35 is a positive film, into the illuminating optical path. At the same time, the control unit 45 retracts the diffusing plate 10 from the illuminating optical path and also drives the mirror switching solenoid 56 to pivot the optical path switching mirror 12 to the position 12' indicated by the dotted lines in FIGS. 2 and 3. Also, the control unit 45 moves the 4×5 film carriage 61 to the illumination position in the subscan direction, at which the carriage 61 opposes the diffusing plate 34. Thereafter, the control unit 45 turns on the light source 2 to allow the light beam from the illuminating means 201 consisting of the condenser lens 3 or the like to illuminate the linear region, in the main scan direction, of the 4×5 film 35 via the optical path switching mirror 12, the cylindrical lens 31, the third optical path bending mirror 32, the Fresnel lens 33, and the diffusing plate 34. The control unit 45 then transmits the image information of the linear region of the 4×5 film 35 thus illuminated to the 4×5 film imaging lens 39 via the forth optical path bending mirror 37 and the fifth optical path bending mirror 38 and causes the 4×5 film imaging lens 39 to image this image information on the surface (imaging surface 112) of the CCD 17 via the sixth optical path bending mirror 42.

3. Subsequently, the carriage driving motor 19 is driven to move the CCD carriage 18 from the home position to the projected image at the position 17' in FIG. 2. Simultaneously, the CCD 17 transfers the detection data of the 4×5 film image to the control unit 45.

4. The control unit 45 drives the 4×5 film lens driving motor 40 to move the 4×5 film imaging lens 39 along the optical axis. At the same time, on the basis of the signal from the CCD 17, the control unit 45 calculates the contrast of the image data to check the in-focus position. The control unit 45 then stops the 4×5 film imaging lens 39 at the in-focus position.

5. Subsequently, the control unit 45 again drives the 4×5 film carriage 61 to return it to the home position. Thereafter, the control unit 45 causes the 4×5 film carriage 61 to start scan for image reading, thereby sequentially detecting the image data.

In this embodiment as discussed above, a large-sized original film (4×5 film 35) is illuminated efficiently, and a small-sized original film (35-mm film 11) is scanned at the fixed position. Consequently, the following effects can be obtained.

1. Generally, small-sized original films, such as 35-mm films, are held in various types of slide mounts in many instances. In these cases, it is sometimes impossible to obtain satisfactory film holding performance in these slide mounts. Even if an image reading apparatus employs an arrangement in which a film itself is scanned, the film may be shifted from a slide mount due to vibrations during scan. In this embodiment as mentioned above, however, the CCD (line sensor) is moved to scan, while the 35-mm film is at rest at the fixed position at which it is two-dimensionally illuminated. This makes it possible to avoid the above problem.

2. An automatic film exchanging device which holds a large number of films, particularly small-sized original films such as 35-mm films and sequentially moves these films to the read position automatically is in many cases demanded to be incorporated into an image reading apparatus. If an image reading apparatus has an arrangement in which a film itself is scanned, the automatic film exchanging device and the scanning system are unavoidably intertwined in a complex manner. This results in a complicated structure of the overall apparatus. However, in this embodiment as discussed above, the CCD (line sensor) is moved to scan, while the 35-mm film is at rest at the fixed position at which it is two-dimensionally illuminated. Consequently, it is possible to circumvent the above problem.

Note that, in this embodiment, the image information of a plurality of objects (first and second objects) also can be read by displacing the objects and the photoelectric converting means (CCD) relative to each other.

FIGS. 10A and 10B are schematic views of main parts for explaining the principle of the arrangement in a modification of the optical system. FIG. 10A is a sectional view (a section in the subscan direction) of the main parts when the optical system is viewed from the above. FIG. 10B is a sectional view (a section in the main scan direction) of the main parts when the optical system is viewed sideways. In FIGS. 10A and 10B, the reference numerals as in FIGS. 4A and 4B denote the same parts.

In this modification, a reading system (first optical system) for reading the 35-mm film 11 is identical with that of the first embodiment discussed above, so a detailed description thereof is omitted. A reading system (second optical system) for reading the 4×5 film 35 is described below.

In this modification, a light beam emitted from the light source 2 forms an aerial image of the light source 2 in the vicinity of a position 2a through the condenser lens 3. A toric lens (optical element) 151 which is an anamorphic element and has a positive refracting power has different powers in the direction of the section in FIG. 10A and in the direction of the section in FIG. 10B. This toric lens 151 images the aerial image directly on the pupil of the 4×5 film imaging lens 39 in the direction of the section of subscan shown in FIG. 10A. In the direction of the section of main scan shown in FIG. 10B, an image 154 reformed by the toric lens 151 is formed in a conjugate manner on the pupil of the 4×5 film imaging lens 39 by a Fresnel lens 152.

In this modification, effects similar to those of the first embodiment described above are obtained by arranging Köhler's illuminating systems independently in the directions of the individual sections.

FIGS. 11A and 11B are schematic views of main parts for explaining the principle of the arrangement in another modification of the optical system. FIG. 11A is a sectional view (a section in the subscan direction) of the main parts when the optical system is viewed from the above. FIG. 11B is a sectional view (a section in the main scan direction) of the main parts when the optical system is viewed sideways. In FIGS. 11A and 11B, the same reference numerals as in FIGS. 4A and 4B denote the same parts.

In this modification, the optical system is constituted by arranging a cylindrical elliptic mirror 153 as an anamorphic element, which also serves as an optical path switching mirror, behind the 35-mm film imaging lens 15.

That is, in the section in the subscan direction shown in FIG. 11A, the cylindrical elliptic mirror 153 has power by which the pupil of the 35-mm film imaging lens 15 and the pupil of the 4×5 film imaging lens 39 are conjugated. In the section in the main scan direction shown in FIG. 11B, the cylindrical elliptic mirror 153 has no power; a Fresnel lens 152 arranged before the 4×5 film 35 conjugates the pupil of the 35-mm film imaging lens 15 with the pupil of the 4×5 film imaging lens 39. In this modification, effects similar to those of the first embodiment described above are obtained by arranging Köhler's illuminating systems independently in the directions of the individual sections.

The image reading apparatus of the present invention explained in the first embodiment above is so arranged that a plurality of objects having different regions to be illuminated can be illuminated with a light beam from the illuminating means, and the image information of the objects thus illuminated is guided to the imaging means arranged in different optical paths in correspondence with the objects, and is imaged on the surface of a single photoelectric converting means by the individual imaging means, thereby allowing the photoelectric converting means to read the image information of the objects, wherein the plurality of objects and the photoelectric converting means are displaced relative to each other.

Also, the image reading apparatus of the present invention explained in the first embodiment above includes the first optical system in which a first object is illuminated with a light beam from the illuminating means and the image information of the first object thus illuminated is imaged on the surface of the photoelectric converting means by the first imaging lens, and the second optical system in which the light beam from the illuminating means is guided by the optical path switching means to the second optical path, which is different from the first optical path of the first optical system, to illuminate a second object having a region to be illuminated different from that of the first object, via the optical means having at least one optical element which is provided in the second optical path and has anisotropy in converging/diverging properties, and the image information of the second object thus illuminated is imaged on the surface of the photoelectric converting element by the second imaging lens provided in the second optical path, wherein the image information of the first or second object is read by displacing the first or second object and the photoelectric converting means relative to each other.

Figure 12:
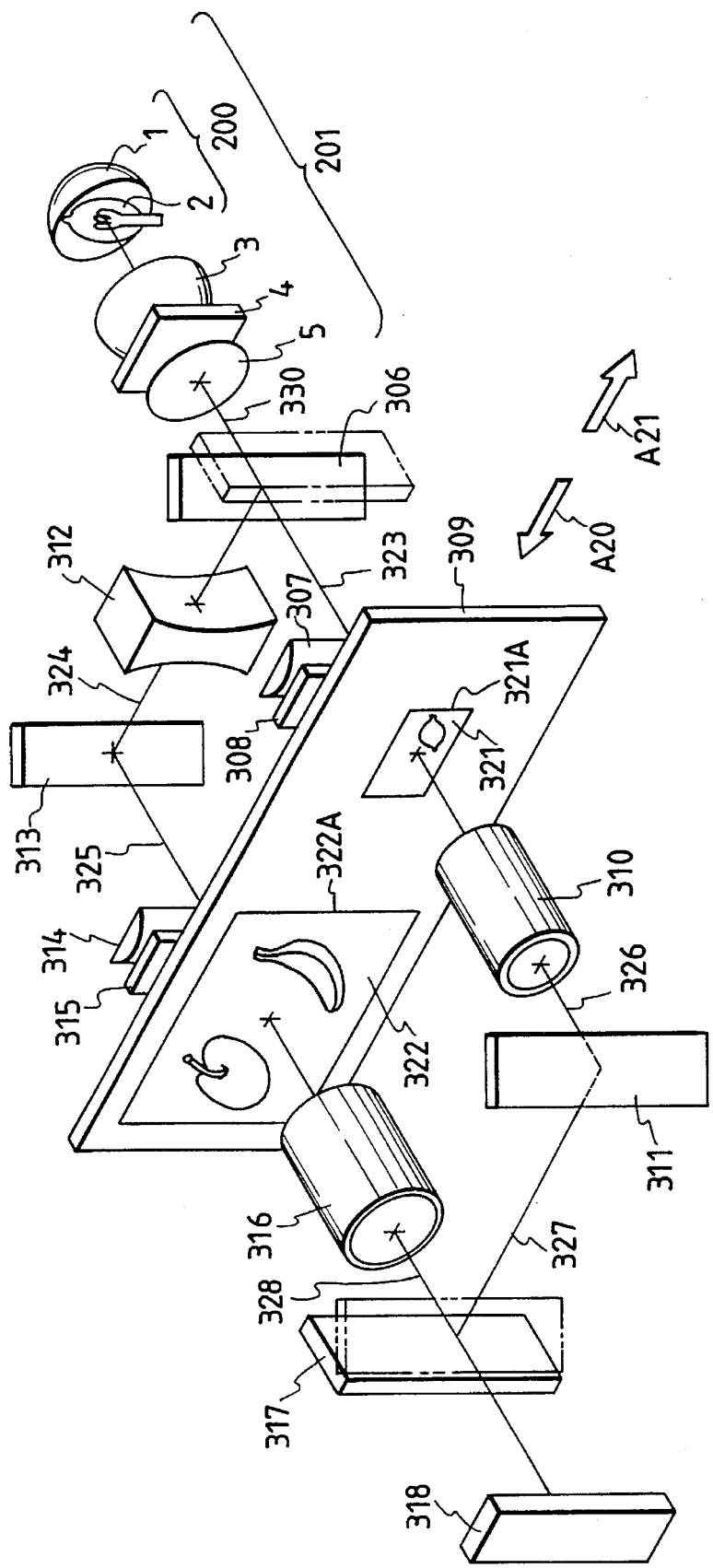
FIG. 12 is a perspective view showing main parts of the second embodiment of the present invention.

FIG. 12 is a schematic view showing main parts of the second embodiment of the present invention. In FIG. 12, the same reference numerals as in FIG. 2 denote the same parts.

Referring to FIG. 12, a first pivotal optical path switching mirror 306 is a first optical path switching means. The first optical path switching means 306 can be switched, by a rotary mechanism (not shown), between a position in which its reflecting surface is inclined 45° from an optical axis 330, and a position in which the reflecting surface is parallel to the optical axis 330 and retracted from an illuminating light beam.

In this embodiment, an illuminating light beam from an illuminating means 201 is selectively guided, by pivoting the first optical path switching mirror 306, to a first illuminating optical path 323 extending to a small-sized original (first object) 321, and second illuminating optical paths 324 and 325 extending to a large-sized original (second object) 322 having a larger width in the main scan direction than the region to be illuminated of the small-sized original 321.

Individual elements are described below along the optical path for reading the small-sized original 321.

A cylindrical lens 307 consists of an anamorphic element and has a positive refracting power in only a predetermined direction (main scan direction). A diffusing plate 308 and the cylindrical lens 307 are arranged in the optical path between the first optical path switching mirror 306 and the small-sized original 21, and efficiently converge the illuminating light beam on a linear region, in the main scan direction, of the small-sized original 321, i.e., one region in the same direction as the direction of an array of pixels of a CCD 318 (to be described later), thereby evenly illuminating that region.

An original support table 309 consists of a light-transmitting plate structure. The original support table 309 supports the small-sized original (first object) 321 and the large-sized original (second object) 322, both of which are light-transmitting, parallel to each other on a single surface perpendicular to the optical axis. Therefore, a light beam incident from one side can exit to the other through the small-sized original 321 or the large-sized original 322. The original support table 309 of this embodiment is linked to a linear reciprocal moving mechanism (not shown) and can be moved to scan in the directions (sub scan directions) indicated by arrows A20 and A21 shown in FIG. 12.

A small-sized original imaging lens (first imaging lens) 310 images the image information of the small-sized original 321 on the surface of the CCD (line sensor) 318 as a photoelectric converting means via an optical path bending mirror 311 and a second pivotal optical path switching mirror 317 as a second optical path switching means.

The second optical path switching mirror 317 can be switched, by a rotary mechanism (not shown), between a position in which its reflecting surface is inclined 45° from an optical axis 328 and a position in which the reflecting surface is parallel to the optical axis 328 and retracted from an imaging light beam from a large-sized original imaging lens 316 (to be described later). This switching operation is interlocked with the switching operation for the first optical path switching mirror 306.

The CCD 318 consists of a photoelectric converting device in which a plurality of light-receiving elements (pixels) are arranged one-dimensionally in the main scan direction. The CCD 318 is arranged at a fixed position of the apparatus main body.

Individual optical elements after the first optical path switching mirror 306 are described below along the optical path for reading the large-sized original 322.

A cylindrical lens 312 consists of an anamorphic element and has a negative refracting power in only a predetermined direction (main scan direction). In this embodiment, the cylindrical lens 312 is arranged near the first optical path switching mirror 306 and diverges the illuminating light beam in the main scan direction in order to illuminate the linear region of the large-sized original 322.

A second optical path bending mirror 313 has a reflecting surface inclined 45° from the optical axis 324 and consequently bends the light beam in a direction parallel to the optical axis of the illuminating optical path 323. A cylindrical lens 314 consists of an anamorphic element and has a positive refracting power in only a predetermined direction (main scan direction). A diffusing plate 315 and the cylindrical lens 314 are arranged in the optical path between the second optical path bending mirror 313 and the large-sized original 322, and efficiently converge the illuminating light beam on a linear region, in the main scan direction, of the large-sized original 322, i.e., one region in the same direction as the direction of the array of the pixels of the CCD 318, thereby evenly illuminating that region.

The large-sized original imaging lens (second imaging lens) 316 is arranged such that the optical axis 328 is parallel to an optical axis 326 of the small-sized original imaging lens 310. With this arrangement, the large-sized original imaging lens 316 images the image information of the large-sized original 322 on the surface of the CCD 318.

In this embodiment, the position of the original support table 309 at the time the illuminating light beam illuminates the linear region at a right end portion 321A or 322A of the small-sized original 321 or the large-sized original 322 is defined as a home position as the start position of subscan of the original support table 309. By moving the original support table 309 from this position in the direction of the arrow A21 (subscan direction), the image information of the linear region (line region), in the main scan direction, of each original is sequentially imaged on the surface of the CCD (line sensor) 318 and read by the CCD.

In this embodiment, the elements from the illuminating means 201 to the CCD 318 via the small-sized original 321 constitute the first optical system, and the elements from the illuminating means 201 to the CCD 318 via the large-sized original 322 constitute the second optical system.

Operation procedures for reading different types of originals according to this embodiment are described below.

(1) The following operation is executed to read the large-sized original 322.

1. The original support table 309 is first located at the home position at which the illuminating light beam illuminates the linear region at the right end portion 322A of the large-sized original 322. At this time, the first optical path switching mirror 306 and the second optical path switching mirror 317 pivot to positions indicated by the solid lines in FIG. 12.

2. When an instruction for starting image scan is entered, power is supplied to a light source 2, and the illuminating light beam emitted from this light source 2 through the illuminating means 201 first illuminates the linear region at the right end portion 322A of the large-sized original 322 via the first optical path switching mirror 306, the cylindrical lens 312, the second optical path bending mirror 313, the cylindrical lens 314, and the diffusing plate 315. The image information of the linear region of the large-sized original 322 thus illuminated is imaged on the surface of the CCD 318 by the large-sized original imaging lens 316. Consequently, the CCD 318 first senses the image data of one region (linear region) of the large-sized original 322.

3. Subsequently, the original support table 309 is moved to scan in the direction of the arrow A21 in FIG. 12. Consequently, the linear region to be illuminated of the large-sized original 322 also moves, and this sequentially moves the projected image formed on the surface of the CCD 318, thereby performing image scan. This allows the CCD 318 to sense the image data of the entire region of the large-sized original 322.

(2) The following operation is executed to read the small-sized original 321.

1. The small-sized original 321 is first located at the home position at which the illuminating light beam illuminates the linear region at the right end portion 321A of the small-sized original 321. At this time, the first optical switching mirror 306 and the second optical path switching mirror 317 pivot to positions indicated by the alternate long and two dashed lines in FIG. 12.

2. When an instruction for starting image scan is entered, power is supplied to the light source 2, and the illuminating light beam emitted from the light source 2 through the illuminating means 201 first illuminates the linear region at the right end portion 321A of the small-sized original 321 via the cylindrical lens 307 and the diffusing plate 308. The image information of the linear region of the small-sized original 321 thus illuminated is imaged on the surface of the CCD 318 by the small-sized original imaging lens 310 via the first optical path switching mirror 311 and the second optical path switching mirror 317. Consequently, the CCD 318 first senses the image data of one region (linear region) of the small-sized original 321.

3. Subsequently, the original support table 309 is moved to scan in the direction of the arrow A21 in FIG. 12. Consequently, the linear region to be illuminated of the small-sized original 321 also moves, and this sequentially moves the projected image formed on the surface of the CCD 318, thereby performing image scan. This permits the CCD 318 to sense the image data of the entire region of the small-sized original 321.

In this embodiment, the position of the original support table at which the linear region at the right end portion of each original is illuminated is defined as the home position at which scan is started. However, it is also possible to define the left end portion of each original as the home position as the scan start position.

In this embodiment as discussed above, an original (object) is moved in the subscan direction with respect to the CCD (line sensor) as the photoelectric converting means arranged at the fixed position, and the image data of that original is sequentially read by the CCD. Consequently, the following effects can be obtained.

1. A plurality of line illuminating systems corresponding to different original sizes can be constituted by the light beam emitted from a single, inexpensive spherical light source. This makes it possible to raise the illumination efficiency and minimize the consumption power.

2. Since image scan in a plurality of imaging optical path systems can be realized by a single original scanning mechanism, the overall arrangement can be simplified.

The image reading apparatus of the present invention explained in the second embodiment above includes the first optical system in which a first object supported by the original support member is illuminated with the light beam from the illuminating means via the optical means having at least one optical element with anisotropy in converging/diverging properties, and the image information of the first object thus illuminated is imaged by the first imaging lens on the surface of the photoelectric converting means via the second optical path switching means, and the second optical system in which the light beam from the illuminating means is guided by the first optical path switching means to the second optical path, which is different from the first optical path of the first optical system, to illuminate a second object supported by the original support member and having a region to be illuminated different from that of the first object, via the optical means having at least one optical element which is provided in the second optical path and has anisotropy in converging/diverging properties, and the image information of the second object thus illuminated is imaged on the surface of the photoelectric converting means by the second imaging lens provided in the second optical path, wherein the image information of the first or second object is read by displacing the original support member, and the first optical path switching means is interlocked with the second optical path switching means.

Figure 13:
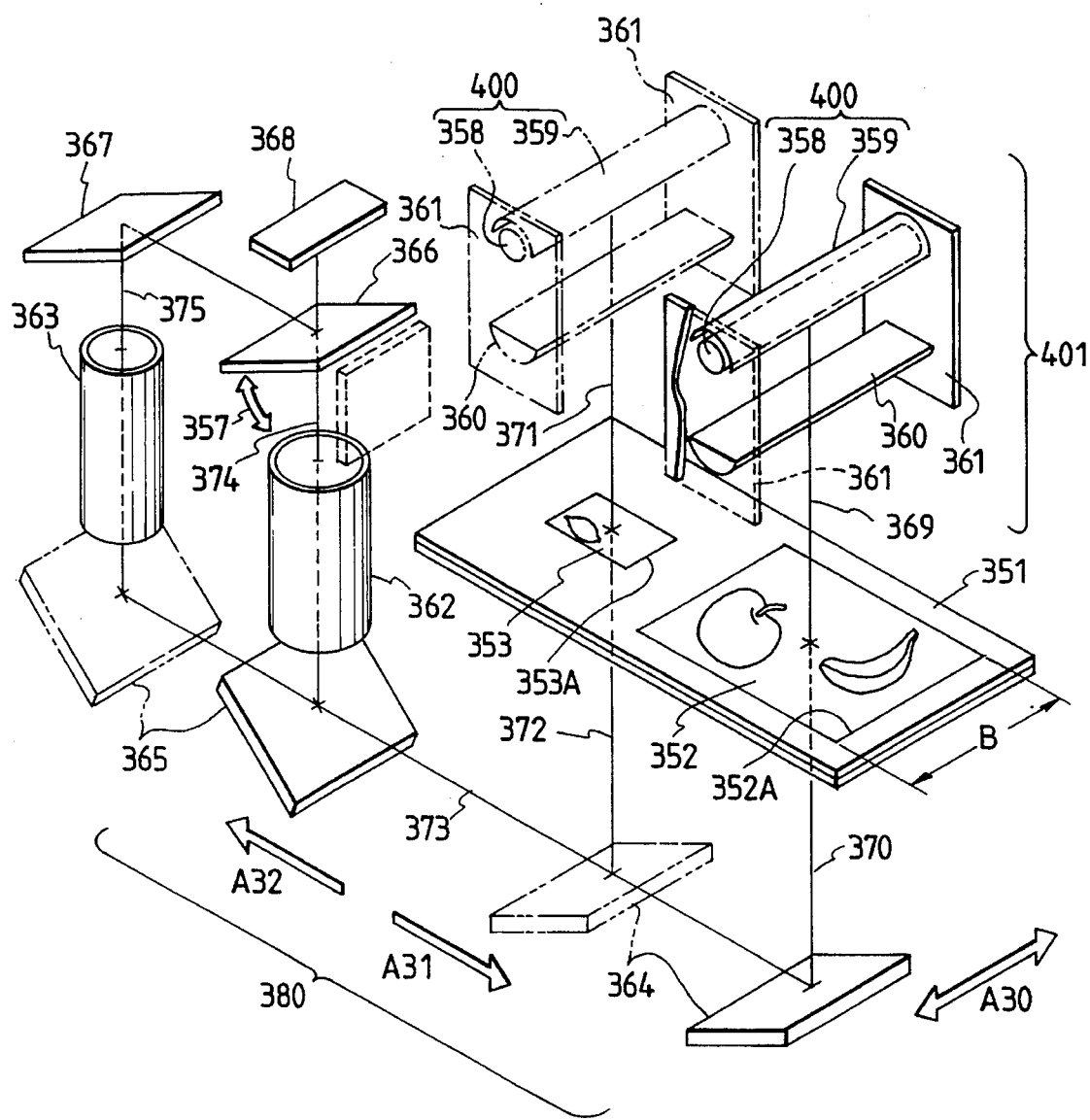
FIG. 13 is a perspective view showing main parts of the third embodiment of the present invention.

FIG. 13 is a schematic view showing main parts of the third embodiment of the present invention. In FIG. 13, the same reference numerals as in FIG. 2 denote the same parts.

Referring to FIG. 13, an original table (original support table) 351 consists of a light-transmitting plate structure and is arranged horizontally at a fixed position of the apparatus main body. On the original table 351, a large-sized original (second object) 352 and a small-sized original (first object) 353, both of which are light-transmitting, are placed parallel to each other on the same horizontal surface. Therefore, a light beam incident from one side can exit to the other through the large-sized original 352 or the small-sized original 353.

An illuminating means 401 can move along the subscan direction. The illuminating means 401 has a light source means 400 consisting of a rod light source 358 and an illumination reflecting mirror (reflecting shade) 359 supported by a support member 361, and a cylindrical lens (optical element) 360 also supported by the support member 361 and consisting of an anamorphic element. The illuminating means 401 is linked to a linear moving mechanism (not shown) and is therefore held by the apparatus main body so as to be movable in the subscan direction in a plane parallel to the original table 351 with the distance to the original table 351 maintained constant.

The rod light source 358 is arranged above the original table 351 such that its longitudinal direction (axial direction) is in agreement with the direction indicated by an arrow A30 in FIG. 13. The length of the light-emitting portion of the rod light source 358 is set to correspond to the width B, in the main scan direction, of the large-sized original 352.

The illumination reflecting mirror 359 has a substantially semicircular section extending in the longitudinal direction of the rod light source 358, and is arranged adjacent to the rod light source 358. When electric power is supplied to the rod light source 358, the illumination reflecting mirror 359 condenses a light beam emitted from the rod light source 358 in a direction opposite to the original table 351 and reflects the condensed light beam toward the original table 351, thereby increasing the illumination efficiency.

The cylindrical lens 360 has a positive refracting power in only a predetermined direction (main scan direction) and is arranged in the optical path between the rod light source 358 and the original table 351. The cylindrical lens 360 converges the light beam emitted from the rod light source 358 on the linear region, in the direction (main scan direction) of the arrow A30, on the large-sized original 352 or on the small-sized original 353 placed on the original table 351, thereby efficiently and evenly illuminating the large-sized original 352 or the small-sized original 353.

In this embodiment, the elements 358, 359, 360, and 361 constituting the illuminating means 401 can move in the subscan direction while maintaining the relative positional relationship. This movement in the subscan direction makes it possible to illuminate the original surfaces of the large-sized original 352 and the small-sized original 353 on the original table 351 under the same conditions.

Additionally, in this embodiment, the position of the illuminating means 401 at which it is located immediately above a right end portion 352A of the large-sized original 352 is defined as a first home position at which scan is started in reading the large-sized original 352. Likewise, the position of the illuminating means 401 at which it is located immediately above a right end portion 353A of the small-sized original 353 is defined as a second home position at which scan is started in reading the small-sized original 353.

A scanning mirror unit 380 as a scanning means can move in the subscan direction. The scanning mirror unit 380 includes a first scanning mirror 364 and a second scanning mirror 365 coupled integrally with each other by a linear moving mechanism (not shown). The scanning mirror unit 380 is so designed as to be movable back and forth in the directions (subscan directions) indicated by arrows A31 and A32 in FIG. 13.

The first scanning mirror 364 is arranged below the original table 351, and its reflecting surface is inclined 45° from an optical axis 370 (372). With this arrangement, the first scanning mirror 364 reflects the illuminating light beam (transmitted light) from the large-sized original 352 or the small-sized original 353 to the left (i.e., toward the second scanning mirror 365) in FIG. 13.

The second scanning mirror 365 is so arranged as to oppose the first scanning mirror 364, and its reflecting surface is inclined 45° from an optical axis 373. With this arrangement, the second scanning mirror 365 reflects the light beam reflected by the first scanning mirror 364 upward (i.e., toward an imaging lens 362 (363)) in FIG. 13.

The scanning mirror unit 380 used in this embodiment scans the large-sized original 352 and the small-sized original 353 in synchronism with the movement of the illuminating means 401, as will be described later.

In this embodiment, the position of the scanning mirror unit 380 at which the first scanning mirror 364 is immediately below the right end portion 352A of the large-sized original 352 is defined as a first home position at which scan is started in reading the large-sized original 352. In addition, the position of the scanning mirror unit 380 at which the first scanning mirror 364 is immediately below the right end portion of the 353A of the small-sized original 353 is defined as a second home position at which scan is started in reading the small-sized original 353.

The linear moving mechanism (not shown) for moving this scanning mirror unit 380 moves the scanning mirror unit 380 in the subscan direction in synchronism with the movement, in the subscan direction, of the illuminating means 401 at the same speed. Consequently, the optical axis 370 or 372 of the region to be illuminated which moves on the surface of the original 352 or 353 due to the movement of the illuminating means 401 also agrees.

The large-sized original imaging lens (second imaging lens) 362 and the small-sized original imaging lens (first imaging lens) 363 are arranged at fixed positions at which their optical axes fall in a vertical plane including the center of the large-sized original 352 and the center of the small-sized original 353, and which are spaced with the same distance as that between the centers of the large-sized original 352 and the small-sized original 353.

A pivotal optical path switching mirror 366 as an optical path switching means is arranged immediately above the large-sized original imaging lens 362 in FIG. 13. The optical path switching mirror 366 can be switched, by a pivoting mechanism (not shown), between a position at which its reflecting surface is inclined 45° from an optical axis 374, and a position at which the reflecting surface is parallel to the optical axis 374 and is retracted from the imaging light beam from the large-sized original imaging lens 362. This switching operation is interlocked with the scanning movement of the illuminating means 401 and the scanning means 380.

An optical path bending mirror 367 is arranged immediately above the small-sized original imaging mirror 363 in FIG. 13, and reflects the imaging light beam from the small-sized original imaging lens 363 toward the optical path switching mirror 366. In this embodiment, when the reflecting surface of the optical path switching mirror 366 is inclined 45° from the optical axis 374 of the large-sized original imaging lens 362, the light beam is reflected upward (i.e., toward a CCD 368) in FIG. 13 so as to be incident on the surface of the CCD (line sensor) 368 as a photoelectric converting means.

The CCD 368 consists of a photoelectric converting device in which a plurality of light-receiving elements (pixels) are arranged in the direction (main scan direction) indicated by the arrow A30 in FIG. 13. The CCD 368 is arranged at a fixed position of the apparatus main body in the upper portion of the plane of the paper.

In this embodiment, the elements from the illuminating means 401 to the CCD 368 via the small-sized original 353 constitute the first optical system, and the elements from the illuminating means 401 to the CCD 368 via the large-sized original 352 constitute the second optical system.

Operation procedures for reading different types of originals according to this embodiment are described below.

(1) The following operation is executed to read the large-size original 352.

1. The illuminating means 401 is first located at the first home position on the side of the right end portion 352A of the large-sized original 352. At this time, the first scanning mirror 364 is also located at the first home position side, and the second scanning mirror 365 which moves together with the first scanning mirror 364 is located at a position below the large-sized original imaging lens 362 and near the right end portion 352A of the large-sized original 352. The optical path switching mirror 366 pivots to a position (indicated by the dotted lines) at which its reflecting surface is parallel to the optical axis 374 of the large-sized original imaging lens 362 and retracted from the imaging light beam of the large-sized original imaging lens 362.

2. When an instruction for starting image scan is entered, power is supplied to the rod light source 358. The light beam emitted from this rod light source 358 is condensed by the cylindrical lens 360 to illuminate the linear region, extending in the direction (main scan direction) of the arrow A30, at the right end portion 352A of the large-sized original 352, i.e., one region in the same direction as the direction (main scan direction) of the array of the pixels of the CCD 368. The image information of the linear region of the large-sized original 352 thus illuminated is imaged on the surface of the CCD 368 by the large-sized original imaging lens 362 via the first scanning mirror 364 and the second scanning mirror 365. Consequently, the CCD 368 first senses the image data of one region of the large-sized original 352.

3. Subsequently, the illuminating means 401 and the scanning mirror unit 380 start scan in the direction (subscan direction) of the arrow A32 in synchronism with each other. With this scanning operation, the region to be illuminated of the large-sized original 352 gradually moves to the left (in the subscan direction) in FIG. 13, and the first and second scanning mirrors 364 and 365 also move in the same direction. Consequently, the image information of the large-sized original 352 is sequentially imaged on the surface of the CCD 368, thereby performing image scan. This allows the CCD 368 to sense the image data of the entire region of the large-sized original 352.

(2) The following operation is executed to read the small-sized original 353.

1. The illuminating means 401 is first located at the second home position on the side of the right end portion 353A of the small-sized original 353. At this time, the first scanning mirror 364 is located at the second home position immediately below the right end portion 353A of the small-sized original 353, and the second scanning mirror 365 which moves together with the first scanning mirror 364 also is located at a position below the small-sized original imaging lens 363 and near the right end portion 353A of the small-sized original 353. The optical path switching mirror 366 pivots to a position (indicated by the solid lines) at which its reflecting surface is inclined 45° from the optical axis 374 of the large-sized original imaging lens 362. This permits the light beam passed through the small-sized original imaging lens 363 to be incident on the surface of the CCD 368 via the reflecting mirror 367 and the optical path switching mirror 366.

2. When an instruction for starting image scan is entered, power is supplied to the rod light source 358. The light beam emitted from this rod light source 358 is condensed by the cylindrical lens to illuminate the linear region, extending in the direction (main scan direction) of the arrow A30, at the right end portion 353A of the small-sized original 353, i.e., one region in the same direction as the direction of the array of the pixels of the CCD 368. The image information of the linear region of the small-sized original 353 thus illuminated is transmitted via the first scanning mirror 364 and the second scanning mirror 365 and imaged on the surface of the CCD 368 by the small-sized original imaging lens 363 via the optical path bending mirror 367 and the optical path switching mirror 366. Consequently, the CCD 368 first senses the image data of one region of the small-sized original 353.

3. Subsequently, the illuminating means 401 and the scanning mirror unit 380 start scan in the direction (subscan direction) of the arrow A32 in synchronism with each other. With this scanning operation, the region to be illuminated of the small-sized original 353 gradually moves to the left (in the subscan direction) in FIG. 13, and the first scanning mirror 364 and the second scanning mirror 365 also move in the same direction. Consequently, the image information of the small-sized original 353 is sequentially imaged on the surface of the CCD 368, thereby performing image scan. This allows the CCD 368 to sense the image data of the entire region of the small-sized original 353.

Note that, in this embodiment, a light guiding means (not shown) consisting of a reflecting mirror or the like is provided in the optical path between the scanning mirror unit 380 and the imaging means (imaging lens), in order to guide the light beam from the scanning mirror unit 380 to the imaging means when the scanning mirror unit 380 moves to scan.

In addition, in this embodiment, the position at which the illuminating means and the scanning means are located immediately above or below the right end portion of each original in the drawing is defined as the first or second home position at which scan is started. However, it is also possible to define the position at which these members are located immediately above or below the left end portion of each original as the first or second home position at which scan is started.

In this embodiment as discussed above, the illuminating means 401 and the scanning mirror unit (scanning means) 380 are moved to scan in the subscan direction in synchronism with each other by the linear moving mechanism (not shown), and the image data of the original is read by the CCD 368. Consequently, the following effects can be obtained.

1. The original table and each imaging lens are set at the fixed positions of the apparatus main body. Therefore, the optical performance can be maintained with a high accuracy even when the imaging optical paths are switched.

2. Since image scan in a plurality of imaging systems can be realized by a single mirror scanning mechanism, the configuration of the overall apparatus can be simplified.

The image reading apparatus of the present invention explained in the third embodiment above includes the first optical system in which a first object placed on the original support table is illuminated with a light beam from the light source means by the illuminating means having the optical means having at least one optical element with anisotropy in converging/diverging properties, and the image information of the first object thus illuminated is transmitted via the scanning means and is imaged on the surface of the photoelectric converting means by the first imaging lens via the optical path switching means, and the second optical system in which a second object placed on the original support table and having a region to be illuminated different from that of the first object is illuminated, and the image information of the second object thus illuminated is transmitted via the scanning means and is imaged on the surface of the photoelectric converting means by the second imaging lens provided in the optical path different from the optical path of the first imaging lens, wherein the image information of the first or second object is read by displacing the illuminating means and the scanning means, and the optical path switching means is interlocked with the displacement between the illuminating means and the scanning means.

In each of the image reading apparatuses according to the first to third embodiments discussed above, at least one optical element constituting the optical means converges the light beam from the illuminating means on the linear regions of the first and second objects in the same direction as the direction of the array of the pixels of the photoelectric converting means.

In addition, in each of the image reading apparatuses according to the first to third embodiments discussed above, the length, in the main scan direction, of the region to be illuminated of the second object is set to be larger than the length, in the main scan direction, of the region to be illuminated of the first object.

Note that each of the above embodiments has been described by taking the image reading apparatus for transmission originals as an example. However, the present invention is similarly applicable to an image reading apparatus for reflection originals, in which an illuminating means and an imaging system are located on the same side with respect to the original surface.

According to the present invention, it is possible to achieve an image reading apparatus by which the following effects can be obtained, by properly setting the individual constituent elements of the apparatus as described above.

1) Even when a wide variety of original sizes are to be handled, an illuminating light beam is supplied from a single light source, and, for particularly a large-sized original, this illuminating light beam need only be converged on a minimum region of the original required for a photoelectric converting means consisting of a CCD (line sensor) or the like to perform scan, without simultaneously, two-dimensionally illuminating the entire region to be read of that original. Consequently, illumination can be performed with an extremely high efficiency. This makes the use of a large light source unnecessary, resulting in a low consumption power.

2) When a large-sized original is to be scanned, an illuminating light beam is converged on a minimum region of the original required for a photoelectric converting means to perform scan. Therefore, it is only necessary to assume the length of a reading scan line on the original surface as the maximum length of an illumination region. This makes it possible to decrease the maximum length of the illumination region compared to that in conventional two-dimensional illumination. Consequently, the space for the illuminating optical path can be decreased, so the entire apparatus can be miniaturized.

3) An imaging lens corresponding to a given original size can be chosen while the lens is held at a predetermined position of the apparatus main body. Therefore, the positional relationship between optical systems can be maintained at a high accuracy even if the structure of the apparatus main body is simplified, as compared with a conventional image reading apparatus in which imaging lenses themselves are moved to be switched. As a consequence, the quality of read images can also be maintained at a high accuracy.

What is claimed is:

1. An image reading apparatus comprising:
   illuminating means for illuminating a first object and a second object different in a region to be illuminated from the first object, the first object and the second object being selectively illuminated by a same light beam generated from said illuminating means;
   photoelectric converting means;
   first imaging means for imaging image information of the first object on said photoelectric converting means; and
   second imaging means for imaging information of the second object on said photoelectric converting means, said second imaging means being arranged in an optical path different from an optical path of said first imaging means.

2. An apparatus according to claim 1, wherein the first and second objects and said photoelectric converting means are displaced relative to each other to read the image information of the first and second objects.

3. An apparatus according to claim 1, further comprising first displacing means for displacing the first object and said photoelectric converting means relative to each other, and second displacing means for displacing the second object and said photoelectric converting means relative to each other.

4. An apparatus according to claim 3, wherein said photoelectric converting means is displaced to read the image information of the first object, and the second object is displaced to read the image information of the second object.

5. An apparatus according to claim 1, wherein the first object is different in size from the second object.

6. An apparatus according to claim 1, wherein said photoelectric converting means selectively detects the image information of the first object and the image information of the second object.

7. An image reading apparatus comprising:

illuminating means for selectively illuminating a first object and a second object different in a region to be illuminated from the first object, said illuminating means having at least one optical element which is arranged in an optical path for illuminating the second object and which has anisotropy in converging/diverging properties, the first object and the second object being selectively illuminated by a same light beam generated from said illuminating means;

photoelectric converting means;

first imaging means for imaging image information of the first object on said photoelectric converting means;

second imaging means for imaging image information of the second object on said photoelectric converting means, said second imaging means being arranged in an optical path different from an optical path of said first imaging means; and means for effecting relative displacement of the first and second object and said photoelectric converting means.

8. An apparatus according to claim 7, wherein the first object is different in size from the second object.

9. An apparatus according to claim 7, wherein said photoelectric converting means selectively detects the image information of the first object and the image information of the second object.

10. An image reading apparatus comprising:

illuminating means for selectively illuminating a first object and a second object different in a region to be illuminated from the first object, said illuminating means having at least one respective optical element which is arranged in each optical path for illuminating the first object and the second object and has anisotropy in converging/diverging properties, the first object and the second object being selectively illuminated by a same light beam generated from said illuminating means;

original support means for supporting the first and second objects;

photoelectric converting means;

first imaging means for imaging image information of the first object on said photoelectric converting means;

second imaging means for imaging image information of the second object on said photoelectric converting means, said second imaging means being arranged in an optical path different from an optical path of said first imaging means; and means for displacing said original support means.

11. An image reading apparatus according to claim 10, further comprising:

scanning means for scanning the image information of the first object or the image information of the second object.

12. An apparatus according to claim 10, wherein the first object is different in size from the second object.

13. An apparatus according to claim 10, wherein said photoelectric converting means selectively detects the image information of the first object and the image information of the second object.

14. An image reading apparatus comprising:

illuminating means for illuminating a first object and a second object different in a region to be illuminated from the first object, the first object and the second object being selectively illuminated by a same light beam generated from said illuminating means;

first imaging means for imaging image information of the first object;

second imaging means for imaging image information of the second object, said second imaging means being arranged in an optical path different from an optical path of said first imaging means; and detection means for selectively detecting the image information of the first object and the image information of the second object.

15. An apparatus according to claim 14, wherein the first object is different in size from the second object.

* * * * *

UNITED STATES PATENT AND TRADEMARK OFFICE
CERTIFICATE OF CORRECTION

PATENT NO. : 5,566,006

DATED : October 15, 1996

INVENTOR(S) : Kenji Yoshinaga, et al.

It is certified that error appears in the above-identified patent and that said Letters Patent is hereby corrected as shown below:

COLUMN 17
  Line 17, "K" should read --Köhler's--.
  Line 18, "öhler's" should be deleted.

COLUMN 18
  Line 40, "original 21," should read --original 321,--.

Signed and Sealed this

Twenty-second Day of April, 1997

Attest:

BRUCE LEHMAN

*Commissioner of Patents and Trademarks*

*Attesting Officer*